United States Patent
Boulter et al.

(10) Patent No.: US 7,454,509 B2
(45) Date of Patent: Nov. 18, 2008

(54) ONLINE PLAYBACK SYSTEM WITH COMMUNITY BIAS

(75) Inventors: Jeffrey Boulter, Los Angeles, CA (US); Todd Beaupre, Los Angeles, CA (US); John-Paul Veilleux, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 954 days.

(21) Appl. No.: 09/903,033

(22) Filed: Jul. 10, 2001

(65) Prior Publication Data

US 2003/0046399 A1    Mar. 6, 2003

Related U.S. Application Data

(63) Continuation-in-part of application No. 09/709,234, filed on Nov. 9, 2000.

(60) Provisional application No. 60/217,594, filed on Jul. 11, 2000, provisional application No. 60/164,846, filed on Nov. 10, 1999.

(51) Int. Cl.
*G06F 15/16* (2006.01)
*G06F 17/30* (2006.01)
*G06F 11/00* (2006.01)

(52) U.S. Cl. ............... 709/231; 705/10; 705/12

(58) Field of Classification Search .......... 704/270; 709/226, 231, 203, 217; 705/5, 10, 12
See application file for complete search history.

(56) References Cited

U.S. PATENT DOCUMENTS

| | | | |
|---|---|---|---|
| 3,568,156 A | 3/1971 | Thompson |
| 4,384,329 A | 5/1983 | Rosenbaum |
| 4,833,610 A | 5/1989 | Zamora |
| 4,996,642 A | 2/1991 | Hey |
| 5,062,143 A | 10/1991 | Schmitt |
| 5,182,708 A | 1/1993 | Ejiri |
| 5,241,674 A | 8/1993 | Kuorsawa |
| 5,303,150 A | 4/1994 | Komeda |
| 5,303,302 A | 4/1994 | Burrows |
| 5,371,807 A | 12/1994 | Register |

(Continued)

FOREIGN PATENT DOCUMENTS

AU    A-53031/98    8/1998

(Continued)

OTHER PUBLICATIONS

MusicMatch Literature from web.archive.org—7 pages total.*

(Continued)

*Primary Examiner*—Nathan J. Flynn
*Assistant Examiner*—J. Bret Dennison
(74) *Attorney, Agent, or Firm*—Greenberg Traurig, LLP; James J. DeCarlo

(57) ABSTRACT

A method for entertaining individuals according to a community having similar tastes. Information derived from user accounts form the basis of a community and collateral preferences allow other subscribing individuals to enjoy the benefit of wider-ranging tastes according to the preferences expressed by the other members of the community. Additionally, assuming that individuals sharing one preference in common may be likely to share others, the present method allows those who choose to listen to the "fan station" the ability to enjoy similar music or other data streams according to preferences expressed by the fan community as a whole.

44 Claims, 7 Drawing Sheets

U.S. PATENT DOCUMENTS

| | | | |
|---|---|---|---|
| 5,392,212 A | 2/1995 | Geist | |
| 5,404,505 A | 4/1995 | Levinson | 395/600 |
| 5,418,951 A | 5/1995 | Damashek | |
| 5,497,488 A | 3/1996 | Akizawa | |
| 5,499,046 A | 3/1996 | Schiller | |
| 5,539,635 A | 7/1996 | Larson, Jr. | |
| 5,548,507 A | 8/1996 | Martino | |
| 5,583,763 A | 12/1996 | Atcheson | |
| 5,592,511 A | 1/1997 | Schoen | |
| 5,608,622 A | 3/1997 | Church | |
| 5,616,876 A * | 4/1997 | Cluts | 84/609 |
| 5,661,787 A | 8/1997 | Pocock | |
| 5,675,786 A | 10/1997 | McKed | |
| 5,678,054 A | 10/1997 | Shibata | |
| 5,704,017 A | 12/1997 | Heckerman et al. | |
| 5,706,365 A | 1/1998 | Rangarajan et al. | |
| 5,708,709 A | 1/1998 | Rose | |
| 5,713,016 A | 1/1998 | Hill | |
| 5,721,827 A | 2/1998 | Logan et al. | |
| 5,726,909 A | 3/1998 | Krikorian | |
| 5,740,134 A | 4/1998 | Peterson | |
| 5,749,081 A * | 5/1998 | Whiteis | 707/102 |
| 5,751,672 A | 5/1998 | Yankowski | |
| 5,754,938 A | 5/1998 | Herz | |
| 5,758,257 A | 5/1998 | Herz et al. | 455/2 |
| 5,764,235 A | 6/1998 | Hunt et al. | |
| 5,774,357 A | 6/1998 | Hoffberg | |
| 5,790,423 A | 8/1998 | Lau et al. | |
| 5,790,935 A | 8/1998 | Payton | 455/5.1 |
| 5,809,246 A | 9/1998 | Goldman et al. | |
| 5,815,662 A | 9/1998 | Ong | |
| 5,819,160 A | 10/1998 | Foladare et al. | |
| 5,842,010 A | 11/1998 | Jain et al. | 395/675 |
| 5,862,220 A | 1/1999 | Perlman | |
| 5,862,339 A | 1/1999 | Bonnaure | |
| 5,864,868 A | 1/1999 | Contois | |
| 5,872,921 A | 2/1999 | Zahariev et al. | |
| 5,881,234 A | 3/1999 | Schwob | |
| 5,883,986 A | 3/1999 | Kopec | |
| 5,884,312 A | 3/1999 | Dustan | |
| 5,898,833 A | 4/1999 | Kidder | |
| 5,913,040 A | 6/1999 | Rakavy | |
| 5,913,041 A | 6/1999 | Ramanathan | |
| 5,926,207 A * | 7/1999 | Vaughan et al. | 725/139 |
| 5,930,526 A | 7/1999 | Iverson | |
| 5,930,768 A | 7/1999 | Hooban | |
| 5,931,901 A * | 8/1999 | Wolfe et al. | 709/206 |
| 5,931,907 A | 8/1999 | Davies | |
| 5,941,951 A | 8/1999 | Day | |
| 5,945,988 A | 8/1999 | Williams | |
| 5,950,189 A | 9/1999 | Cohen | |
| 5,956,482 A | 9/1999 | Agraharam | |
| 5,960,430 A | 9/1999 | Haimowitz | |
| 5,969,283 A * | 10/1999 | Looney et al. | 84/609 |
| 5,977,964 A | 11/1999 | Williams | |
| 5,983,176 A | 11/1999 | Hoffert | |
| 5,987,525 A | 11/1999 | Roberts | |
| 5,996,015 A | 11/1999 | Day | |
| 6,000,008 A | 12/1999 | Simcoe | |
| 6,005,603 A | 12/1999 | Flavin | |
| 6,009,382 A | 12/1999 | Martino | |
| 6,012,098 A | 1/2000 | Bayeh | |
| 6,020,883 A * | 2/2000 | Herz et al. | 715/721 |
| 6,021,203 A | 2/2000 | Douceur | |
| 6,026,398 A * | 2/2000 | Brown et al. | 707/5 |
| 6,026,439 A | 2/2000 | Chowdhury | |
| 6,029,195 A | 2/2000 | Herz | |
| 6,031,795 A | 2/2000 | Wehmeyer | |
| 6,031,797 A | 2/2000 | Van Ryzin | |
| 6,035,268 A | 3/2000 | Carus | |
| 6,038,527 A | 3/2000 | Renz | |
| 6,038,591 A | 3/2000 | Wolfe | |
| 6,047,251 A | 4/2000 | Pon | |
| 6,047,268 A | 4/2000 | Bartoli | |
| 6,047,320 A | 4/2000 | Tezuka | |
| 6,047,327 A | 4/2000 | Tso | |
| 6,049,777 A * | 4/2000 | Sheena et al. | 705/10 |
| 6,052,717 A | 4/2000 | Reynolds | |
| 6,061,680 A | 5/2000 | Scherf | |
| 6,064,379 A | 5/2000 | DeMoney | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,088,722 A * | 7/2000 | Herz et al. | 709/217 |
| 6,092,049 A * | 7/2000 | Chislenko et al. | 705/10 |
| 6,097,719 A | 8/2000 | Benash | |
| 6,102,406 A | 8/2000 | Miles | |
| 6,105,022 A | 8/2000 | Takahashi | |
| 6,112,186 A * | 8/2000 | Bergh et al. | 705/10 |
| 6,119,163 A * | 9/2000 | Monteiro et al. | 709/227 |
| 6,131,082 A | 10/2000 | Hargrave, III | |
| 6,134,532 A | 10/2000 | Lazarus | |
| 6,138,142 A | 10/2000 | Linsk | |
| 6,154,773 A | 11/2000 | Roberts | |
| 6,161,132 A | 12/2000 | Roberts | |
| 6,161,139 A | 12/2000 | Win | |
| 6,167,369 A | 12/2000 | Schulze | |
| 6,182,142 B1 | 1/2001 | Win | |
| 6,185,560 B1 | 2/2001 | Young | |
| 6,192,340 B1 * | 2/2001 | Abecassis | 704/270 |
| 6,199,076 B1 | 3/2001 | Logan et al. | |
| 6,199,082 B1 * | 3/2001 | Ferrel et al. | 715/522 |
| 6,205,126 B1 | 3/2001 | Moon | |
| 6,222,980 B1 | 4/2001 | Asai | |
| 6,225,546 B1 | 5/2001 | Kraft | |
| 6,230,192 B1 | 5/2001 | Roberts | |
| 6,230,207 B1 | 5/2001 | Roberts | |
| 6,240,459 B1 | 5/2001 | Roberts | |
| 6,246,672 B1 * | 6/2001 | Lumelsky | 370/310 |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 | 8/2001 | de Campos | |
| 6,272,495 B1 | 8/2001 | Hetherington | |
| 6,282,548 B1 | 8/2001 | Burner | |
| 6,292,795 B1 | 9/2001 | Peters | |
| 6,298,446 B1 | 10/2001 | Schreiber | |
| 6,314,421 B1 | 11/2001 | Sharnoff | |
| 6,317,761 B1 | 11/2001 | Landsman | |
| 6,321,205 B1 | 11/2001 | Eder | |
| 6,321,221 B1 | 11/2001 | Bieganski | |
| 6,330,592 B1 * | 12/2001 | Makuch et al. | 709/217 |
| 6,330,593 B1 | 12/2001 | Roberts | |
| 6,334,127 B1 * | 12/2001 | Bieganski et al. | 707/5 |
| 6,343,317 B1 | 1/2002 | Glorikian | |
| 6,349,339 B1 | 2/2002 | Williams | |
| 6,353,849 B1 | 3/2002 | Linsk | |
| 6,370,315 B1 | 4/2002 | Mizuno | |
| 6,370,513 B1 | 4/2002 | Kolawa | |
| 6,389,467 B1 | 5/2002 | Eyal | |
| 6,405,203 B1 | 6/2002 | Collart | |
| 6,411,992 B1 * | 6/2002 | Srinivasan et al. | 709/218 |
| 6,430,539 B1 | 8/2002 | Lazarus | |
| 6,434,535 B1 | 8/2002 | Kupka | |
| 6,438,579 B1 * | 8/2002 | Hosken | 709/203 |
| 6,487,598 B1 | 11/2002 | Valencia | |
| 6,490,553 B2 | 12/2002 | Van Thong | |
| 6,505,160 B1 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |
| 6,526,411 B1 | 2/2003 | Ward | |

| | | |
|---|---|---|
| 6,526,580 B2 | 2/2003 | Shimomura et al. |
| 6,532,477 B1 | 3/2003 | Tang |
| 6,535,854 B2 | 3/2003 | Buchner |
| 6,538,996 B1 | 3/2003 | West |
| 6,546,421 B1 | 4/2003 | Wynblatt et al. |
| 6,557,026 B1 | 4/2003 | Stephens, Jr. |
| 6,557,042 B1 | 4/2003 | He et al. |
| 6,560,403 B1 | 5/2003 | Tanaka |
| 6,560,704 B2 | 5/2003 | Dieterman |
| 6,587,127 B1 | 7/2003 | Leeke |
| 6,611,812 B2 | 8/2003 | Hurtado |
| 6,611,813 B1 | 8/2003 | Bratton |
| 6,614,914 B1 | 9/2003 | Rhoads |
| 6,614,987 B1 | 9/2003 | Ismail et al. |
| 6,615,039 B1 * | 9/2003 | Eldering ............... 455/418 |
| 6,615,208 B1 | 9/2003 | Behrens |
| 6,655,963 B1 | 12/2003 | Horvitz |
| 6,657,117 B2 | 12/2003 | Weare |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 | 10/2004 | Carpentier |
| 6,889,383 B1 | 5/2005 | Jarman |
| 6,925,441 B1 | 8/2005 | Jones, III |
| 6,931,451 B1 * | 8/2005 | Logan et al. ............... 709/231 |
| 6,952,523 B2 | 10/2005 | Tanaka |
| 6,963,899 B1 * | 11/2005 | Fernandez et al. ........... 709/203 |
| 6,993,590 B1 * | 1/2006 | Gauthier et al. ............ 709/231 |
| 7,003,515 B1 * | 2/2006 | Glaser et al. .................. 707/5 |
| 7,010,537 B2 * | 3/2006 | Eyal et al. .................. 707/100 |
| 7,058,694 B1 * | 6/2006 | De Bonet et al. ............. 709/217 |
| 7,072,846 B1 * | 7/2006 | Robinson ...................... 705/10 |
| 7,080,153 B2 * | 7/2006 | Monteiro et al. ............ 709/231 |
| 7,081,579 B2 * | 7/2006 | Alcalde et al. ................. 84/608 |
| 7,085,845 B2 * | 8/2006 | Woodward et al. .......... 709/231 |
| 7,115,808 B2 * | 10/2006 | Lu et al. ......................... 84/611 |
| 7,133,924 B1 * | 11/2006 | Rosenberg et al. ........... 709/231 |
| 7,146,627 B1 * | 12/2006 | Ismail et al. .................... 725/47 |
| 7,155,734 B1 | 12/2006 | Shimomura et al. |
| 7,158,531 B2 | 1/2007 | Barton |
| 7,167,895 B1 * | 1/2007 | Connelly ..................... 709/203 |
| 7,228,305 B1 * | 6/2007 | Eyal et al. .................. 707/100 |
| 7,243,129 B1 * | 7/2007 | Thomas ...................... 709/207 |
| 7,363,314 B2 * | 4/2008 | Picker et al. ................ 707/102 |
| 7,396,990 B2 * | 7/2008 | Lu et al. ....................... 84/611 |
| 2001/0005823 A1 | 6/2001 | Fischer |
| 2001/0013123 A1 | 8/2001 | Freeman et al. |
| 2001/0042107 A1 | 11/2001 | Palm |
| 2001/0042109 A1 | 11/2001 | Bolas |
| 2001/0044855 A1 | 11/2001 | Vermeire |
| 2001/0052028 A1 | 12/2001 | Roberts |
| 2001/0053944 A1 | 12/2001 | Marks et al. |
| 2001/0055276 A1 | 12/2001 | Rogers |
| 2002/0002039 A1 | 1/2002 | Qureshey |
| 2002/0004839 A1 | 1/2002 | Wine |
| 2002/0007418 A1 | 1/2002 | Hegde |
| 2002/0010621 A1 | 1/2002 | Bell |
| 2002/0010714 A1 | 1/2002 | Hetherington |
| 2002/0010789 A1 * | 1/2002 | Lord ........................... 709/231 |
| 2002/0013852 A1 | 1/2002 | Janik |
| 2002/0016839 A1 | 2/2002 | Smith |
| 2002/0019858 A1 | 2/2002 | Kaiser et al. |
| 2002/0026499 A1 * | 2/2002 | Cantone et al. ............. 709/219 |
| 2002/0035561 A1 | 3/2002 | Archer |
| 2002/0045717 A1 | 4/2002 | Grenda |
| 2002/0049717 A1 * | 4/2002 | Routtenberg et al. ........... 707/1 |
| 2002/0054087 A1 * | 5/2002 | Noll et al. .................... 345/744 |
| 2002/0056004 A1 | 5/2002 | Smith |
| 2002/0056100 A1 | 5/2002 | Shimomura et al. |
| 2002/0065857 A1 | 5/2002 | Michalewicz |
| 2002/0077988 A1 | 6/2002 | Sasaki et al. |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0111912 A1 | 8/2002 | Hunter |
| 2002/0116082 A1 * | 8/2002 | Gudorf ......................... 700/94 |
| 2002/0129123 A1 | 9/2002 | Johnson |
| 2002/0152204 A1 | 10/2002 | Ortega |
| 2002/0157034 A1 | 10/2002 | Segar |
| 2002/0175941 A1 | 11/2002 | Hand |
| 2003/0002608 A1 | 1/2003 | Glenn |
| 2003/0007507 A1 | 1/2003 | Rajwan |
| 2003/0028796 A1 | 2/2003 | Roberts |
| 2003/0033420 A1 * | 2/2003 | Eyal et al. .................... 709/231 |
| 2003/0046283 A1 | 3/2003 | Roberts |
| 2003/0083871 A1 | 5/2003 | Foote |
| 2003/0093476 A1 | 5/2003 | Syed |
| 2003/0103644 A1 * | 6/2003 | Klayh ......................... 382/100 |
| 2003/0133453 A1 | 7/2003 | Makishima |
| 2003/0135513 A1 | 7/2003 | Quinn |
| 2003/0139989 A1 | 7/2003 | Churquina |
| 2003/0140160 A1 * | 7/2003 | Raz et al. .................... 709/231 |
| 2003/0165200 A1 | 9/2003 | Pugel |
| 2003/0182139 A1 | 9/2003 | Harris |
| 2003/0190077 A1 | 10/2003 | Ross |
| 2003/0206558 A1 | 11/2003 | Parkkinen |
| 2004/0059826 A1 * | 3/2004 | Gould et al. ................ 709/231 |
| 2004/0090462 A1 | 5/2004 | Graham |
| 2004/0103372 A1 | 5/2004 | Graham |
| 2004/0199657 A1 * | 10/2004 | Eyal et al. .................... 709/231 |
| 2005/0149759 A1 | 7/2005 | Vishwanath |
| 2005/0216942 A1 * | 9/2005 | Barton ........................... 725/97 |
| 2006/0149813 A1 | 7/2006 | Janik |
| 2006/0206478 A1 * | 9/2006 | Glaser et al. .................... 707/5 |
| 2006/0212442 A1 * | 9/2006 | Conrad et al. .................... 707/5 |
| 2006/0212444 A1 * | 9/2006 | Handman et al. ................. 707/5 |
| 2006/0282544 A1 * | 12/2006 | Monteiro et al. ............ 709/231 |

FOREIGN PATENT DOCUMENTS

| | | |
|---|---|---|
| EP | 0 173 639 A2 | 3/1986 |
| EP | 0 643 359 A2 | 3/1995 |
| EP | 0 751 471 A | 1/1997 |
| EP | 0 847 156 A2 | 7/1998 |
| EP | 0 860 785 A | 8/1998 |
| EP | 0 847 156 A2 | 10/1998 |
| EP | 0 955 592 A2 | 11/1999 |
| EP | 0 955 592 A3 | 11/1999 |
| EP | 1 050 833 A2 | 8/2000 |
| EP | 1 050 830 A2 | 11/2000 |
| EP | 1 236 354 A0 | 5/2001 |
| EP | 1 010 098 B1 | 6/2003 |
| EP | 1 324 567 A2 | 7/2003 |
| EP | 1 324 567 A3 | 7/2003 |
| GB | 2306869 | 11/1995 |
| GB | 2 306 869 | 7/1997 |
| JP | 2001202368 | 7/2001 |
| JP | 2001521642 T | 11/2001 |
| WO | WO 97/07467 | 2/1997 |
| WO | WO 98/25269 A1 | 6/1998 |
| WO | WO 98/33135 A | 7/1998 |
| WO | WO 98/47080 A2 | 10/1998 |
| WO | WO 99/27681 | 6/1999 |
| WO | WO 99/43111 | 8/1999 |
| WO | WO 00/04474 A | 1/2000 |
| WO | WO 00/31964 | 6/2000 |
| WO | WO 00/46681 A1 | 8/2000 |
| WO | WO 01/33379 A1 | 5/2001 |
| WO | WO 01/35667 A1 | 5/2001 |
| WO | WO 01/54323 A2 | 7/2001 |
| WO | WO 01/73639 A1 | 10/2001 |
| WO | WO 02/42862 A2 | 5/2002 |

WO WO 03/012695 A2 2/2003

OTHER PUBLICATIONS

RealNetworks Literature from web.archive.org—16 pages total.*
Bill Konig, "The College Music Journal names TuneTo.com, CMJ Website of the Week", "http://web.archive.org/web/20000412122646/www.tuneto.com/company/news/cmj120899.html", Apr. 12, 2000.*
Business Wire, "Former WebRadio.com Executive to Lead TuneTo.com's Strategic Partnership Development with the Music Industry, http://findarticles.com/p/articles/mi_m0EIN/is_1999_Oct_19/ai_56527957", Oct. 19, 1999.*
Business Wire, "SpinRecords.com Announces Launch of Internet Music Made Easy", "http://findarticles.com/p/articles/mi_m0EIN/is_2000_April_6/ai_61343598", Apr. 6, 2000.*
Business Wire, Top Execs From Microsoft & RealNetworks to Keynote Kagan Streaming Media Conference Oct. 6-7 in New York, "http://findarticles.com/p/articles/mi_m0EIN/is_1999_Oct_4/ai_55968610", Oct. 4, 1999.*
Shands, Mark, "An Exclusive Interview with Michael Weiss, TuneTo.com","http://web.archive.org/web/20000414081433/www.hitmakers.com/archivedfeats/weiss.html", Apr. 14, 2000.*
Alvear, Jose, "Q&A with Tim Bratton, President of TuneTo.com", "http://web.archive.org/web/20000417161149/www.tuneto.com/company/news/smn112399.html", Nov. 23, 1999.*
Mark Smotroff, "TuneTo.com Seals $2.6 Million Series A Funding", "http://web.archive.org/web/20000606181901/www.tuneto.com/company/news/pr011800.html", Jan. 18, 2000.*
Dennis Michael, "CNN story on downloadable music and Internet radio includes Tim Bratton, President of TuneTo.com", "http://web.archive.org/web/20000229210114/www.tuneto.com/company/news/cnn120299.html" Dec. 2, 1999.*
Ian Goldberg, Steven D. Gribble, David Wagner, and Eric A. Brewer, "The Ninja Jukebox," *Proceedings of USITS' 99: The 2nd USENIX Symposium on Internet Technologies & Systems*, Boulder, Colorado, USA, Oct. 11-14, 1999.
U.S. Appl. No. 60/144,377, filed Jul. 16, 1999, Benjamin E. Hosken.
U.S. Appl. No. 60/165,726, filed Nov. 15, 1999, Sean Michael Ward.
U.S. Appl. No. 60/165,727, filed Nov. 15, 1999, Sean Michael Ward.
U.S. Appl. No. 60/166,039, filed Nov. 17, 1999, Sean Michael Ward.
"Fast Algorithms for Projected Clustering;" Charu C. Aggarwal, Cecilia Procopiuc, Joel L. Wolf, Philip S. Yu, and Jong Soo Park. Proceedings of the ACM SIGMOD International Conference on Management of Data, 1999.
"Mel-Frequency Cepstrat Analysis," [online] [retrieved on Feb. 2, 2001] Retrieved from the Internet <URL:http://ccrma-www.stanford.edu/~unjung/mylec/mfcc.html>, pp. 1-3.
Agosti, M., Gradenigo, G. Marchetti, P.G., "A Hypertext Environment for Interacting with Large Textual Databases," pp. 469-477.
Alan Griffiths, H. Claire Luckhurts & Peter Willett, "Using Interdocument Similarity Information in Document Retrieval Systems," pp. 365-373, © 1986 by John Wiley & Sons, Inc.
Belkin, N.J. Oddy, R.N., Brooks, H.M., "The Journal of Documentation," vol. 38, No. 2, Jun. 1982, pp. 299-304.
Brian P. McCune, Richard M. Tong, Jeffrey S. Dean & Daniel G. Shapiro, "RUBRIC: A System for Rule-Based Information Retrieval," pp. 440-445.
R. Brody, Ph.D., "The Conditions and Consequences of Profiling in Commercial and Governmental Settings," Technology And Society, 1998. ISTAS 98. Wiring The World: The Impact Of Information Technology On Society, Proccedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.
C.J. van Rijsbergen B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk.keith/preface.html> (213 pages).
Chapter 3—"Key Concepts," pp. 85-92 Found in: Readings in Information Retrieval, Edited by Karen Sparck Jones & Peter Willett, Morgan Kaufmann Publishers, Inc., San Francisco, CA © 1997.

MusicMatch Literature downloaded from web.archive.org—7 pages total.
RealNetworks Literature downloaded from web.archive.org—16 pages total.
Cyril Cleverdon, "The Cranfield Tests On Index Language Devices," presented Apr. 27, 1967, pp. 47-59, Found in: *Readings in Information Retrieval, Edited by Karen Sparck Jones & Peter Willett, Morgan Kaufmann Publishers, Inc.*, San Francisco, CA © 1997.
Cyril W. Cleverdon & J. Mills, "The Testing Of Index Language Devices," presented Feb. 5, 1963, Chapter 3—Key Concepts, pp. 98-110, Found in: *Readings in Information Retrieval, Edited by Karen Sparck Jones & Peter Willett, Morgan Kaufmann Publishers, Inc.*, San Francisco, CA © 1997.
Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.
E. Michael Keen, "Presenting Results of Experimental Retrieval Comparisons," Department of Information & Library Studies, University College of Wales, Aberystwyth, Sy23 3AS U.K., pp. 217-222.
G. Salton & M.E. Lesk, "Computer Evaluation Of Indexing and Text Processing," pp. 60-84, Found in: Readings in Information Retrieval, Edited by Karen Sparck Jones & Peter Willett, Morgan Kaufmann Publishers, Inc., San Francisco, CA © 1997.
G. Salton & M.J. McGill, "The Smart and Sire Experimental Retrieval Systems," pp. 381-399.
G. Salton, A. Wong & C.S. Yang, "A Vector Space Model for Automatic Indexing," Cornell University, pp. 273-280.
Gerard Salton & Christopher Buckley, "Term-Weighting Approaches In Automatic Text Retrieval," (received Nov. 19, 1987; accepted in final form Jan. 26, 1988), Department of Computer Science, Cornell University, Ithaca, NY.
Gerard Salton & Michael J. McGill, "Introduction to Modern Information Retrieval," Computer Science Series, pp. 1-435, © 1983 by McGraw-Hill, Inc., McGraw-Hill Book Company, USA.
Hayes, Connor, et al., "Smart Radio—A Proposal," Technical Report TCD-CS-1999-24, Online! Apr. 1999, pp. 1-14, XP002279579, Trinity College Dublin, Ireland, Retrieved from the Internet: <URL:http://www.cd.tcd.ie/publications/tech-reports/reports.99/TCD-1999-24.pdf>, retrieved on May 7, 2004.
Hoffman, Thomas, et al., "Latent Class Models For Collaborative Filtering," Proceedings Of The Sixteenth International Joint Conference On Artificial Intelligence, IJCAI 99, Stockholm, Sweden, Jul. 31-Aug. 6, 1999, Online! pp. 688-693, XPOO2279578, Retrieved from the Internet <URL:http:/Avww.cs.brown.edu/(th/papers/HofmannPuzicha-IJCA199).pdf>, retrieved on May 7, 2004.
Hull, David A. and Grefenstette, Gregory, "Querying Across Languages: A Dictionary-Based Approach to Multilingual Information Retrieval," pp. 484-492.
Internet Papers: Freetantrum: Songprint 1.2, and computer code; www.freetantrum.org; Dec. 11, 2000; 46 pages.
Jean Tague-Sutcliffe, "The Pragmatics of Information Retrieval Experimentation Revisited," School of Library & Information Science, University of Western Ontario, Canada pp. 205-216.
Jones, Karen Sparck, Jones, G.J.F., Foote, J.T. and Young, S.J., "Experiments in Spoken Document Retrieval," pp. 493-502.
Jones, Karen Sparck and Willett, Peter, "Readings In Information Retrieval," Morgan Kaufmann Publishers, Inc., 1997, pp. 25-110, 205-246, 257-412, 440-445, 469-502, 527-533.
Karen Sparck Jones, "Search Term Relevance Weighting Given Little Relevance Information," pp. 329-338, (originally located in Journal of Documentation, vol. 35, No. 1; Mar. 1979, pp. 30-48).
Lancaster, F.W., "MEDLARS: Report on the Evaluation of Its Operating Efficiency," pp. 223-246.
Lauren B. Doyle, "Indexing and Abstracting by Association—Part 1," pp. 25-38, Santa Monica, CA, Found in: *Readings in Information Retrieval, Edited by Karen Sparck Jones and Peter Willett, Morgan Kaufmann Publishers, Inc.*, San Francisco, CA © 1997.
Liu, Zhu, Wang, Yao and Chen, Tsuhan, "Audio Feature Extraction and Analysis for Scene Segmentation and Classification," Journal of VLSI Signal Processing 20.61-79 (1998).

Loeb, Shoshana, "Architecting Personalized Delivery Of Multimedia Information," Communications Of The ACM, vol. 25, No. 12, Dec. 1992, pp. 39-50, XP002102709.

M.F. Porter, "An Algorithm For Suffix Stripping," Computer Laboratory, Corn Exchange Street Cambridge, 313-316.

M.E. Maron & J.L. Kuhns, "On Relevance, Probabilistic Indexing and Information Retrieval," pp. 39-46, Found in: *Readings in Information Retrieval, Edited by Karen Sparck Jones and Peter Willett, Morgan Kaufmann Publishers, Inc* ., San Francisco,CA © 1997.

Nichols, David M. et al., Recommendation And Usage In The Digital Library, Technical Report Ref. CSEG/2/1997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2007.

Rau, Lisa F., "Conceptual Information Extraction and Retrieval from Natural Language Input," Artificial Intelligence Program GE Research and Development Center, Schenectady, NY 12301, pp. 527-533.

S.E Robertson, "The Probability Ranking Principle In 1R," School of Library, Archive, Information Studies, University College of London, pp. 281-286.

S.E. Robertson and S. Walker, "Some Simple Effective Approximations to the 2-Poisson Model for Probabilistic Weighted Retrieval," Centre for Interactive Systems Research, Department of Information Science, City University, Northampton Square, London, ECIV OHB, U.K., pp. 345-354.

Salton, Gerard, Allan, James, Buckley, Singhal, Amit, "Automatic Analysis, Theme Generation, and Summarization of Machine-Readable Texts," pp. 478-483.

Schafer, J. Ben, et al., "Recommender Systems In E-Commerce," Proceedings ACM Conference On Electronic Commerce, 1999, pp. 158-166, XP002199598.

Shah, Tej, "Improving Electronic Commerce Through Gather Customer Data," TCC402 [online] Apr. 23, 1998 XP002379874, University of Virginia, USA, Retrieved from the Internet: <URL:http://www.lib.virginia.edu> [Retrieved on May 8, 2006] *the whole document*.

Stubblefield, Adam and Wallach, Dan S., "A Security Analysis of Mp.MP3.com and the Beam-it Protocol," Department of Computer Science, Rice University.

Tomek Strzalkowski, "Robust Text Processing in Automated Information Retrieval," Courant Institute of Mathematical Sciences, pp. 317-322.

W.B. Croft and D.J. Harper, "Using Probabilistic Models of Document Retrieval Without Relevance Information," Department of Computer & Information Science, University of Massachusetts, pp. 339-344.

W.J. Hutchins, "The Concept of 'Aboutness' in Subject Indexing," presented Apr. 18, 1977, Chapter 3—Key Concepts, pp. 93-97, Found in: *Readings in Information Retrieval, Edited by Karen Sparck Jones & Peter Willett, Morgan Kaufmann Publishers, Inc*., San Francisco, CA © 1997.

Witten, Ian H. and Frank, Eibe, "Data Mining, Practical Machine Learning Tools and Techniques with JAVA Implementations," Academic Press, pp. 57-76.

World, Erling, Blum, Thom, Keislar, Douglas and Wheaton, James, "Content-Based Classification, Search, and Retrieval of Audio," IEEE Multimedia, Fall 1996.

Written Opinion of the Patent Cooperation Treaty for International Patent Application No. PCT/US02/03504.

Supplementary European Search Report (EP 01 95 1043).

Business Wire, "WebRadio.com Joins Arbitron infoStream Webcast Ratings Alliance; Arbitron to Provide Third-Party Measurement to New Web-Based Radio Broadcasting," May 6, 1999.

Deborah Kong, Knight-Ridder News Service, "The Internet Can Turn Music Lovers into DJs," Philadelphia Inquirer, Nov. 4, 1999.

Business Wire, "WebRadio.com Strengthens Internet Radio Destination With Content, Community, Convenience and Functionality," Aug. 31, 1999.

* cited by examiner

FIG. 2

ONLINE PLAYBACK SYSTEM WITH COMMUNITY BIAS

CROSS-REFERENCES TO RELATED APPLICATIONS

The present application claims the benefit of U.S. Provisional Patent Application Ser. No. 60/217,594 filed Jul. 11, 2000 for Online Playback System With Community Bias, and is a continuation-in-part of U.S. patent application Ser. No. 09/709,234 filed Nov. 9, 2000, pending, for Internet Radio And Broadcast Method, which claims the benefit of U.S. Provisional Patent Application Ser. No. 60/164,846 filed on Nov. 10, 1999 for an Internet Radio and Broadcast Method, which applications are incorporated herein by reference.

BACKGROUND OF THE INVENTION

1. Field of the Invention

This invention relates to database generation and data stream transmission, and more particularly to biased data stream transmission method according to a community of subscribers or fans enjoying similar tastes.

2. Description of the Related Art

In an online environment, the demand for digital entertainment is limited by statute in the United States of America under the Digital Millennium Copyright Act (DMCA, Digital Millennium Copyright Act of 1998, Public Law 105-304). Legitimate providers of online entertainment must adhere to the DMCA and pay license fees for the copyrighted works broadcast over the Internet or other online environment. Otherwise, such providers are liable for copyright infringement.

The Digital Millennium Copyright Act (DMCA) addresses protections for copyrighted works transmitted online. The DMCA entitles websites that stream music to a statutory license to perform copyrighted sound recordings as long as they meet certain requirements. Compliance with these requirements is by, among other ways: not streaming over a three-hour period, more than three songs or more than two in a row from the same recording, or four songs or more than three in a row from the same recording artist or anthology; and by transmitting songs in a noninteractive format by, for example, not allowing users to specifically create or request programming on demand or to hear programming at designated times. Additionally, compliance with the DMCA requires that advance song or artist playlists not be published.

In an online environment, the content provider may "narrowcast" the data feed to a single individual and still comply with the DMCA even though thousands of individual narrowcast transmissions are made simultaneously. For example, so long as each individual narrowcast does not violate the DMCA, compliance with the DMCA is maintained.

"Narrowcasting" is a term that may be new in the art. As a contrast to "broadcasting" where information is broadcast on a wide basis and generally available to anyone with a tuned receiver, "narrowcasting" arises from the individually addressable data packets used in TCP/IP protocol. The packets are addressed to individual computers and include almost all forms of data transmission over the Internet. Consequently, when broadcasting occurs on the Internet, it is generally composed of a bundle of narrowcast packets as each one must be individually addressed to the computers of the audience. This is true even though several computers are receiving the same content at the same time. Each computer must be individually addressed even though the packets are identical. When demand is high for Internet content such as a live performance or transmission, bandwidth may not be sufficient for all who request transmission.

Due to the nature of Internet communications and TCP/IP protocol, narrowcasting is one of the basic and easy ways in which to transmit information packets. Multicasting may also be used (See Bob Quinn, Killer Network Apps That Aren't Network Killers, Dr. Dobb's Journal October 1997), but has drawbacks due to technical obstacles in effecting a multicast on the open Internet. Other protocols (such as FTP) also exist.

Under the LAUNCHcast™ system (the subject of the 09/709,234 patent application indicated above), each subscriber may "tune" his or her narrowcast by expressing preferences that are recorded and preserved in an account associated with the user/subscriber.

The LAUNCHcast™ system provides a means by which DMCA compliance can be maintained while biasing narrowcast transmissions according to audience/individual preferences. By soliciting, receiving, and recording an individual's preferences regarding (for example) a music data stream, LAUNCH Media, Inc. provides digital audio feed to a subscriber that both complies with the DMCA as well as catering to the individual's musical tastes. If the musical tastes of the individual are limited, additional music may be used to fill in "airtime" or "nettime" that cannot be filled with the individual's favorite songs as such transmission would violate the DMCA. Conversely, an individual with broad tastes could have very few works transmitted in the data stream that fall outside of the individual's tastes.

Very often, people who enjoy one type of music or artist also enjoy other types of music or artists so that an appearance of association between the two occur without an obvious causal link. For example, individuals who enjoy music by Barry Manilow might also enjoy the music of Neil Sedaka in a high percentage that may exceed random statistical occurrence. Consequently, when accompanied by a rating system or engine, individuals who enjoy Barry Manilow might welcome music by Neil Sedaka although they may have never heard music by Neil Sedaka before.

The present invention allows enhancement of narrowcast transmission for the listener's or consumer's enjoyment while maintaining compliance with the DMCA. By associating communities of listeners/consumers around specific artists or genres, subscribers or listeners of an online data stream entertainment service are provided with a more focused and enjoyable experience as the data stream is catered to their preference by using a community bias based upon those who enjoy such artists, an individual artist, genres, or an individual genre.

Note should be taken that the method described herein pertains not only to audio data streams, but any sort of data stream where preferences may be present, including video and multimedia. As entertainment data streams are particularly susceptible to strong personal preferences, the present invention resolves a need for providing dynamic accommodation of expressed preferences in a community of subscribers or listeners while complying with applicable copyright law.

SUMMARY OF THE INVENTION

The present invention provides for a biased data stream that is biased according to those who prefer data streams of particular types. Using the example above, a community enjoying Barry Manilow could be used to bias a data stream towards both songs by Barry Manilow and those songs that the members of the Barry Manilow community enjoy. Consequently, through the use of preferences expressed by feedback of each individual member of the Barry Manilow community, a Barry Manilow-based radio station or data stream set emerges. Narrowcasting based upon such a biased data stream may then be subject to DMCA constraints so that no one narrowcast transmission violates the DMCA, yet the data stream transmission is biased according preferences expressed by the Barry Manilow community as a whole.

The biasing of such a data stream becomes more robust and more reliable with greater numbers of members and when such members express a large number of preferences regarding the type of music they enjoy.

Note should be taken that the term "music" as used herein is used as a shorthand for any data stream subject to taste or preference. Music data streams form a basic analogy from which all other data streams may be comparably likened, unless otherwise indicated. Additionally, the use of Barry Manilow as an artist of preference is arbitrary and could be substituted by current, modern, or classical artists such as Melissa Etheridge, Karen Carpenter, Rosemary Clooney, Phil Harris, Hank Williams, Led Zeppelin, Luciano Pavarotti, or Spike Jones.

OBJECTS OF THE INVENTION

It is an object of the present invention to provide more entertaining online data feeds.

It is another object of the present to provide more entertaining data streams by providing a biased data stream according to a listener's/consumer's preferences.

It is yet another object of the present invention to provide a more entertaining data stream by biasing a data stream according to a community expressing preferences for significant components of the data stream, such as an artist or genre.

It is yet another object of the present invention to provide a community biased music data stream according to a community expressing preferences for music carried by said data stream, such as an artist or genre.

These and other objects and advantages of the present invention will be apparent from a review of the following specification and accompanying drawings.

These and other objects and advantages of the present invention will be apparent from a review of the following specification and accompanying drawings.

BRIEF DESCRIPTION OF THE DRAWINGS

Figure 2:
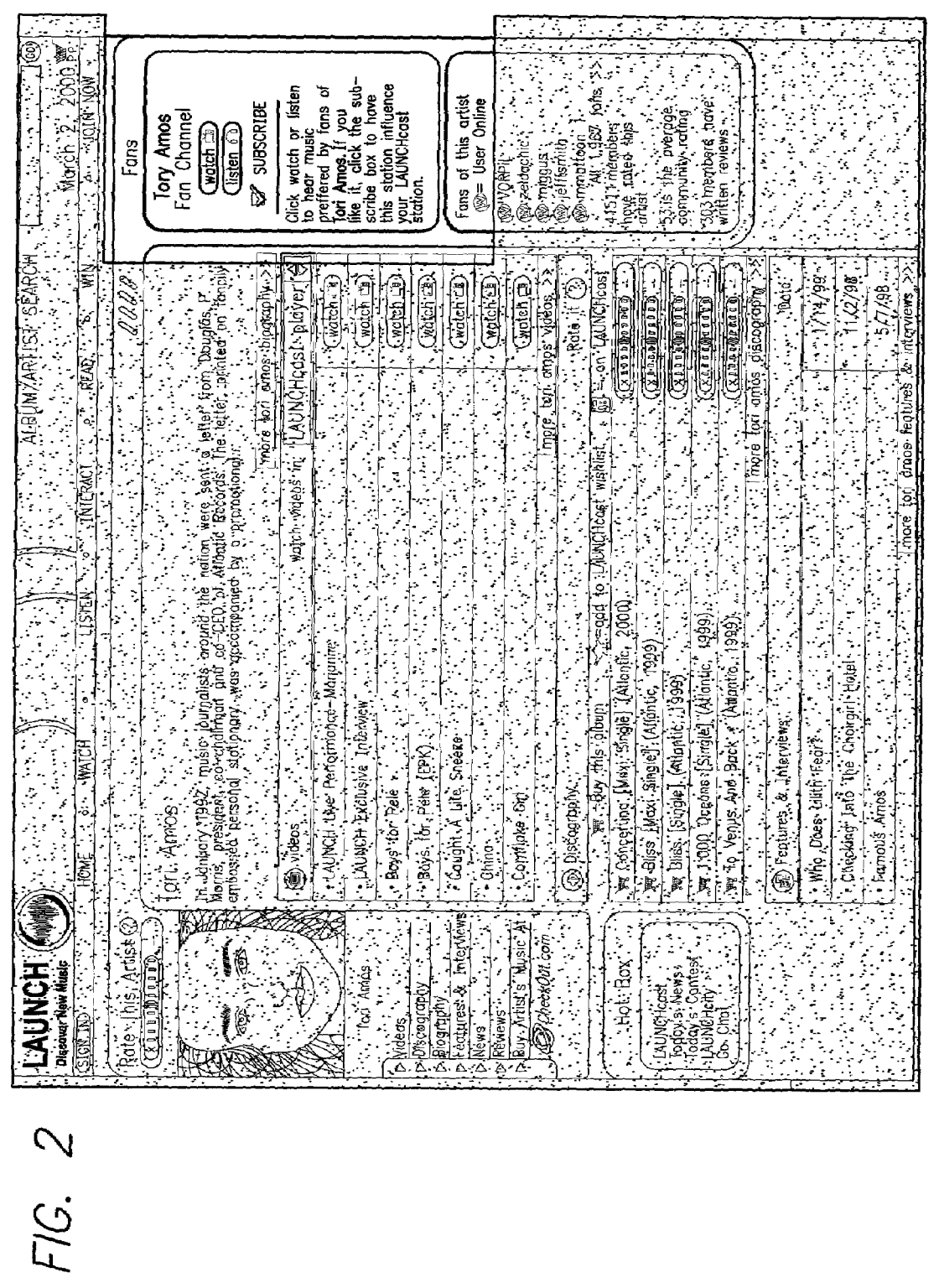

FIG. 2 shows a similar exemplary artist page with the Fan Station option highlighted.

DESCRIPTION OF THE PREFERRED EMBODIMENT(S)

Figure 1:
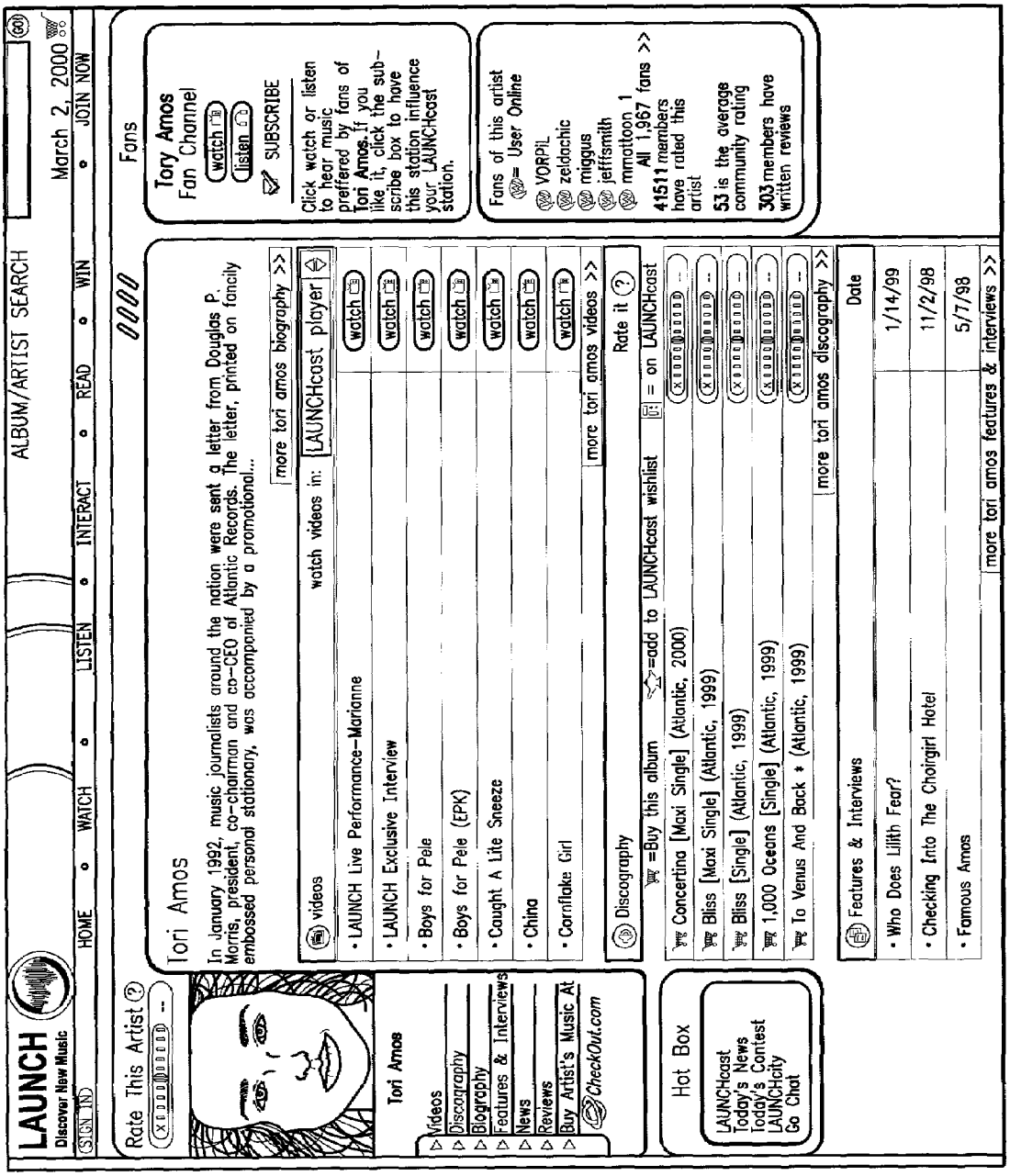
FIG. 1 shows an exemplary page for an artist, in this case Tori Amos.
Figure 3:
FIG. 3 is an isolated view of the Fan Station option shown in FIGS. 1 and 2.
Figure 4:
FIG. 4 is an enlarged view of FIG. 3.
Figure 5:
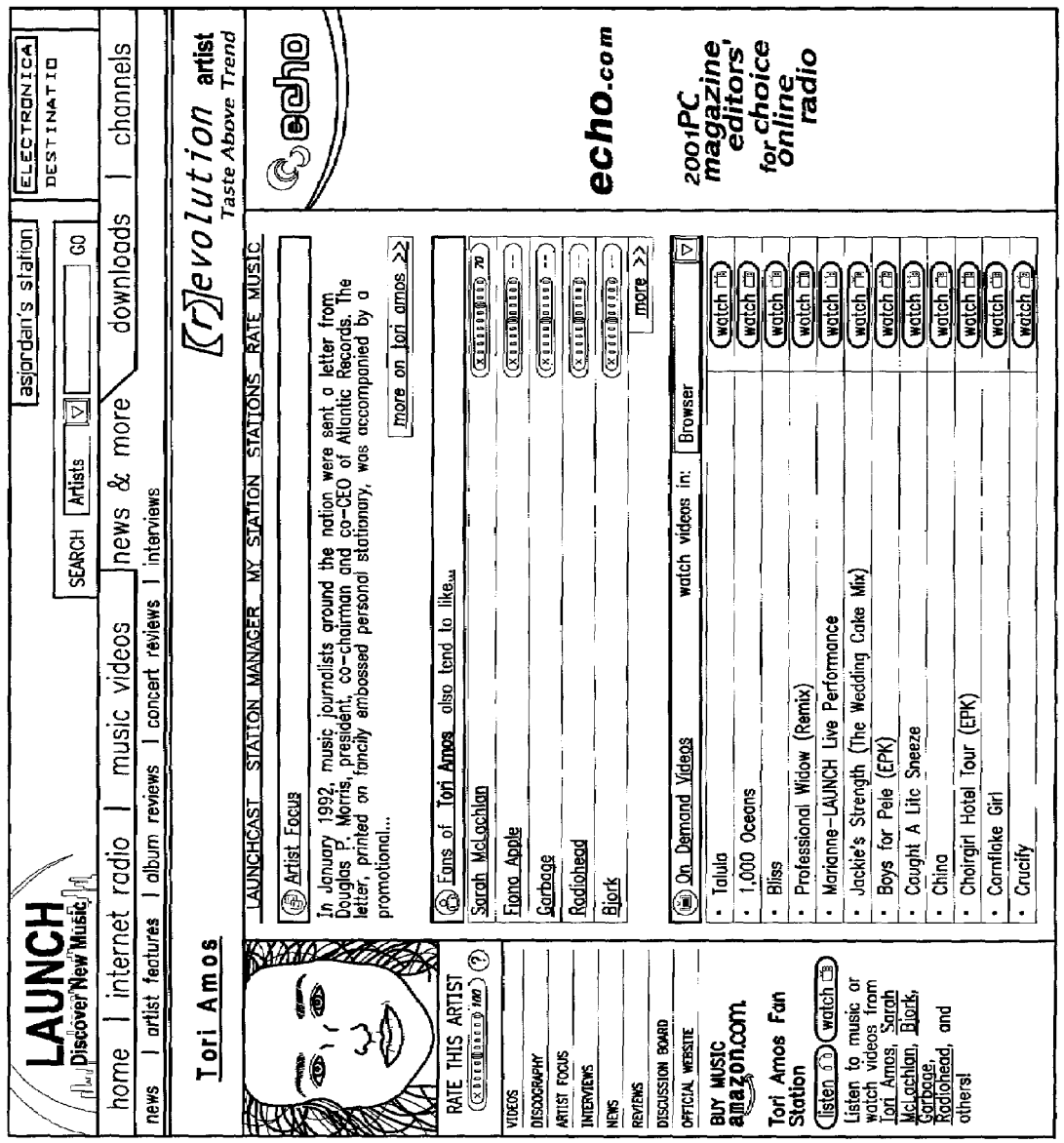
FIG. 5 shows an alternative exemplary page for an artist, in this case Tori Amos.
Figure 6:
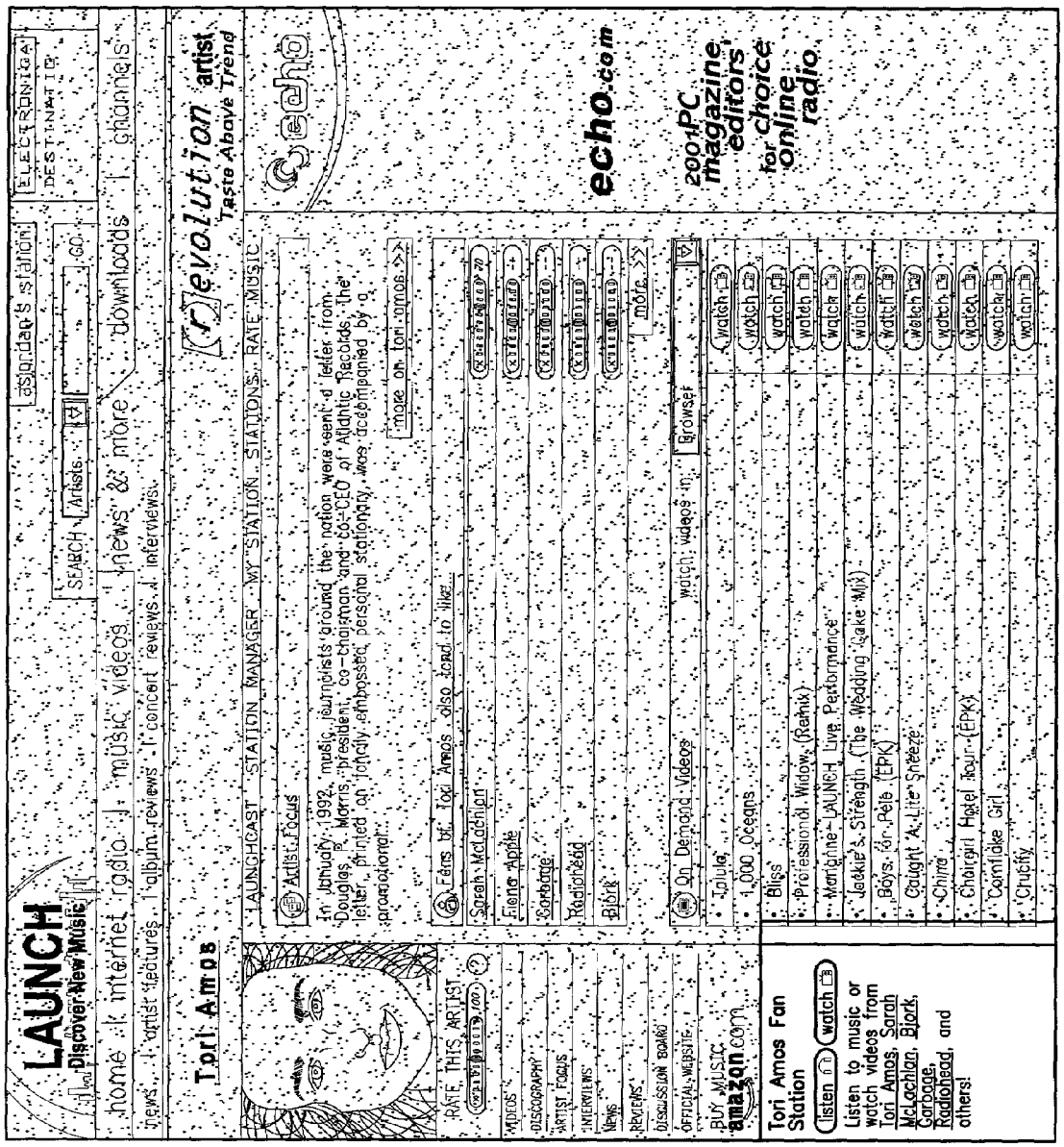
FIG. 6 shows a similar alternative exemplary artist page with the Fan Station option highlighted.
Figure 7:
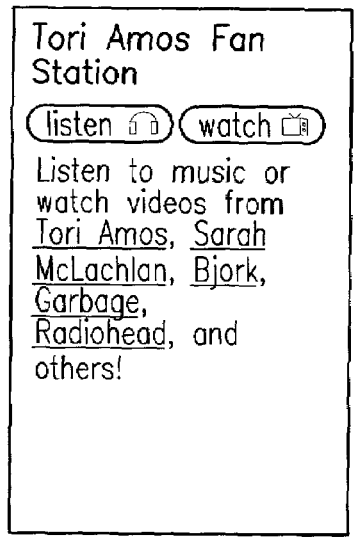
FIG. 7 is an isolated view of the alternative Fan Station option shown in FIGS. 5 and 6.
Figure 8:
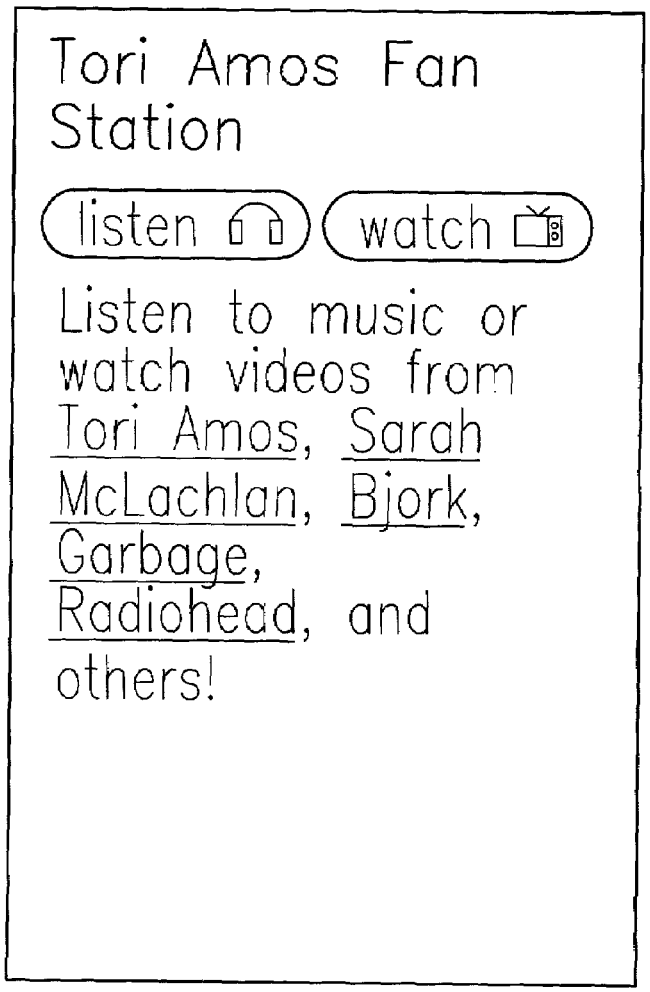
FIG. 8 is an enlarged view of FIG. 7.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention resides in the establishment of a community based upon shared musical tastes. Upon receiving and recording a statistically significant number of preferences and feedback regarding songs, those who prefer an artist may be distinguished from other users who may form a background against which fans of such an artist are distinguished.

Using as an example the contemporary artist Tori Amos, FIGS. 1-8 show alternative commercial presentations of the present invention. As for almost all artists in its library, LAUNCH Media maintains home pages for artists from which users/subscribers may select links to additional information, including the purchase of works by the artist. As an option on the home page, interested individuals may select to hear an audio stream based upon the preferences of users who like that artist, in this case, who like Tori Amos.

By selecting the "listen" or "watch" links in the Fan Station section of the Tori Amos home page (FIGS. 3 and 4 and FIGS. 7 and 8), individuals can receive data streams biased according to a community that likes Tori Amos. As the Tori Amos community may tend to share other musical tastes, the data stream that results from the Fan Station link selection may also entertain the individual so selecting the link as that individual's tastes may correspond to the tastes of the Tori Amos community as a whole just as it did with the artist Tori Amos.

In order to determine a community's preferences, only those individuals in the subscriber database who are "fans" of the artist are used to determine the community's preferences. The term "fan" may be arbitrarily defined as those individual subscribers who rate Tori Amos as a 70 or more on a scale of 100 with 0 being a least favorite artist and 100 being a most favorite artist. The choice is arbitrary but needs to reflect a bias sufficient to entertain, or even delight, those who choose to listen to the community channel.

Upon determining the community of interest (Tori Amos fans, for example), collateral data regarding other preferences are gathered from those same individuals who are designated fans of Tori Amos. For example, in one embodiment, for each member of the community, all other rated artists besides Tori Amos are inspected. Those artists who also scored 70 or higher are noted and temporarily stored in a database. After all of the member accounts of the community have been polled, those artists who are present in 70% of the accounts may be chosen as artists whose music will also be transmitted as secondary musical selections in narrowcast to those who choose the Tori Amos Fan Station.

In an alternative embodiment, the collateral artists may be chosen according to popularity with no floor threshold (of 70% as in the embodiment above, or otherwise). In another alternative embodiment, songs rated by the community may take precedent over artist ratings such that individual songs are selected for narrowcast transmission from community preferences as opposed to portfolios of songs according to different artists (again according to community preferences).

In this way, a community may be defined and its preferences determined. Of course, other data streams subject to preference or taste may be substituted for the music/audio data stream as set forth in the example above, including video, multimedia, or otherwise.

Figure 9:
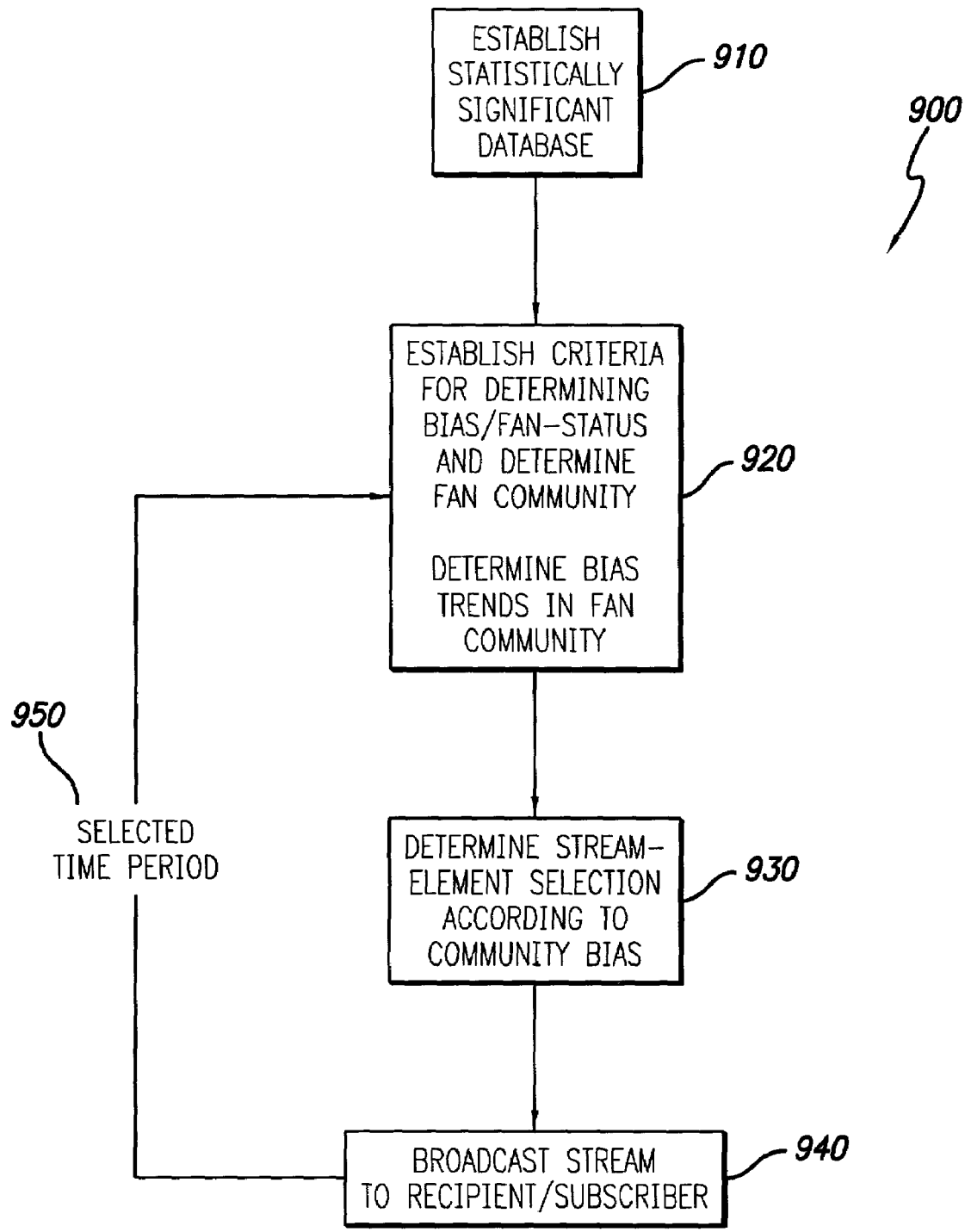
FIG. 9 is a diagrammatic view of steps taken in the present invention.

The present invention is shown diagrammatically in FIG. 9. As shown in FIG. 9, the present invention 900 provides steps for achieving the community bias system in order to provide data streams consistent with such community preferences. The online playback system with community bias 900 of the present invention begins first with establishing a statistically-significant database 910. This database may be a database comprised of all users of a system such as LAUNCHcast™ or the like. Such a statistically-significant database has entries with artistic preferences of the individual subscribers. Such preferences may include artists and songs preferred and not preferred (liked and disliked), as well as albums that the subscribers or recipients prefer or do not prefer.

The entire subscriber community generally defines the artistic or preferential "space" in which the present invention operates. Using such a geometrical point of view, certain sub-areas of the artistic database may then be the subject of the community preference system 900 set forth herein. In order to achieve the present invention, certain delimitations must be made as to what defines a community, and the preferences expressed by the subscriber/recipient serve in this capacity.

Statistical significance is a relative term. The goal of the present invention is to provide entertainment or other desired data streams to the recipients. Here, the data streams are songs or music videos. However, other data streams subject to subscriber databases where preferences are expressed for the content or type of data stream may also put to good use the present invention and are within the scope of the present invention and of the claims set forth herein. Statistical significance arises in the form of certain threshold criteria by which certain preferences are deliminated and/or distinguished from others. Generally, those who listen to country music may not want to also listen to heavy metal music. Those who would prefer rap may also like to listen to hip-hop music. Those who enjoy classical music may not enjoy swing or polka music. Depending upon the available databases of both subscribers and data streams, certain subgenres may be available such as all-Mozart or all-Beethoven community channels.

While feedback may be obtained from the recipients of the community-biased data streams, generally the present invention uses the rule of thumb of approximately "70" as the rating threshold by which a person is considered to be a "fan" of the artist or the like. The "70" rating could be interpreted as indicating that the artist is in the top one-third (⅓) of the individual's preferred artists. By dwelling in this top ⅓ area, a community may be defined, although the exact numerical criteria may depend upon the range of the "space" available for use in the present invention, as well as the number of subscribers and data streams. Generally, the broader and more numerous the original and primary database of subscribers and datastreams, the higher and more exclusive the threshold rating may be.

Upon establishing a statistically-significantly database 910, certain criteria must be established for determining a community's bias 920. Upon choosing that threshold, the statistically-significant database 910 is then filtered, sorted, or evaluated, to determine what trends are present with respect to fan or subscriber preferences. As mentioned above, the rating of an artist of approximately above 70 on a scale of 0-100 is considered to be a relevant and significant threshold. The use of artists to define a genre or a consistent theme with respect to music generally arises from the fact that artists tend to write the same kind of music or the same type of music much in the same way as Vivaldi and Mozart had their own separate and distinct styles.

Upon determining the trends in the fan community 920, a selection of individual stream elements may be made 930. Such stream elements are generally in conformance with two criteria: the community bias trends established in step 920, as well as any applicable copyright law. In the United States, the Digital Millenium Copyright Act (DMCA) generally controls such on-line transmissions of copyright works such as sound recordings and audio-visual works.

The stream selection step 930 may be achieved in two modes of transmission. One mode would be a narrowcast mode where different individual streams are transmitted to different recipients who have chosen and are currently listening to a community fan station. Alternatively, one transmission stream could be distributed simultaneously to all current listeners of the fan station/community channel. Both of these transmission methods are in compliance with the DMCA and provide alternative means by which the present invention 900 may be realized.

When an individual hears a song on a community channel that he or she ("he") would like to rate, the rating tool may be made available to him via the player tool. The rating so made by the individual is then recorded in his or her preferential settings as a subscriber to the database 910. The user's ratings may indirectly affect the data stream selection 930 as it may form part of the database used to determine the community and the stream selected for the corresponding channel. The user must be a fan of the artist, for example, to effect that artist's community channel.

Once the stream selection process 930 has been performed, the stream is then broadcast to the recipient(s)/subscriber(s) 940. The recipients then enjoy the receipt of the data streams and may be exposed to new music according to their own expressed preference indicated by subscribing to the fan station. Consequently, an individual who likes country music and chooses a Hank Williams community channel may be exposed to music by Porter Wagner which he or she may also like. The same is similarly true for contemporary musical style such as rap and hip-hop, as well as musical styles developed in the past, currently under development, or to be developed in the future.

In order to maintain the relevance of the community channel/fan station, the trend determining step 920, stream selection step 930 may be re-engaged after a certain period of time ranging from one week to several months 950. This allows for those who enjoy a certain type of music to benefit from currently-popular related styles and to allow the stream selection process 930 to be updated to reflect current tastes.

While the present invention has emphasized entertainment in the form of data streams relating to songs, sound recordings, and audio visual work such as music videos, the present invention is also applicable to data stream transmission systems that must comply with a regulatory scheme (such as the DMCA) in view of express preferences for content and/or type (such as the music individual persons like and dislike). Certain automated processes may benefit from the present invention, as machine-implemented processes may operate under a wide variety of conditions and benefit from the transmission of data streams such as information- and/or content-dependent data streams dependent upon a wide variety of factors, including geographic location, climate, other environmental conditions, or otherwise. For example, the data streams may be sets of suggested instructions for artificially-intelligent systems operating under situations requiring problem-solving abilities.

The source code listing sets forth with particularity certain software methods by which one embodiment of the present invention may be achieved. The listing is believed to provide a full and complete disclosure of one embodiment of the present invention.

While the present invention has been described with regards to particular embodiments, it is recognized that additional variations of the present invention may be devised without departing from the inventive concept.

TEXT LISTING OF SOURCE CODE

The following copyrighted source code provides a realizable embodiment of the present invention and is presented by way of example and not by limitation. Other source code and compilations thereof may implement the present invention without duplicating the following source code.

```
package com.launch.rm.lc.SimilaritiesEngine;
import java.util.Hashtable;
import java.util.Enumeration;
import java.util.Vector;

/**
 * This class finds a bunch of items that a group of users have
 * in common that they've rated highly. The items are sorted from
 * highest group rating to lowest group rating.
 *
 * @author Jeff Boulter
 * @author John Veilleux
 */
public class Consensus
{
    private Hashtable contenders = new Hashtable( );
    private Vector finalistIDVec = new Vector( );
    private int itemID = -1;
    private int ratingCount = 0;
    /**
     * Creates an empty consensus.
     */
    public Consensus( )
    {
    }
    /**
     * Creates a consensus with an item that should be excluded from
     * the users' ratings.
     *
     * @param   itemID     the ID of the item to exclude
     */
    public Consensus( int itemID )
    {
        this.itemID = itemID;
    }
    /**
     * Creates a consensus where the list of items generated doesn't
     * have to exclude a specific item.
     *
     * @param   userRatings    the user ratings
     */
    public Consensus( Vector userRatings )
    {
        addRatings( userRatings );
    }
    /**
     * Creates a consensus where the given item must be excluded
     * from the list of items that's generated.
     *
     * @param   itemID         the ID of the item to exclude
     * @param   userRatings    the user ratings
     */
    public Consensus( int itemID, Vector userRatings )
    {
        this.itemID = itemID;
        addRatings( userRatings );
    }
    /**
     * Polls the group of users for their final list of items.
     *
     * @return  the list of item ID's ordered from highest to lowest
     *          group rating
     */
    public OrderedList poll( )
    {
        OrderedList result = new OrderedList( );
```

```
            Integer ratingItemID = null;
            GroupRating groupRating = null;
            for ( int i = finalistIDVec.size( ) - 1; i >= 0; i -- )
            {
                ratingItemID = (Integer) finalistIDVec.elementAt( i );
                groupRating = (GroupRating) contenders.get( ratingItemID );
                result.add( groupRating.get( ), groupRating );
            }
            return result;
        }
        /**
         * Gets the total number of ratings within the pool of users.
         *
         * @return   the rating count
         */
        public int getRatingCount( )
        {
            return ratingCount;
        }
        /**
         * Adds ratings to the consensus by users who will determine the
         * final list of items.
         *
         * @param   userRatings      the vector containing each user's
         *                                    ratings
         */
        public void add Ratings( Vector userRatings )
        {
            Rating r;
            r = null;
            for ( int i = userRatings.size( ) - 1; i >= 0; i -- )
            {
                r = (Rating) userRatings.elementAt( i );
                if (r.itemID != itemID)
                {
                    add( r );
                }
            }
        }
        /**
         * Adds a rating to be used in the calculation of a contender
         * item's group rating. Once an item gets a specified minimum
         * number of ratings to calculate a group rating, it gets put
         * into the finalist list.
         */
        private void add( Rating r )
        {
            Integer ratingItemID = new Integer( r.itemID );
            GroupRating contenderGR = (GroupRating) contenders.get( ratingItemID
);
            if ( contenderGR == null )
            {
                contenderGR = new GroupRating( r.itemID );
                contenders.put( ratingItemID, contenderGR );
            }
            else if ( contenderGR.getNumRatings( ) == (
SimilaritiesConstants.MIN_FANS_FOR_RECOMMENDED_ITEM - 1 ) )
            {
                finalistIDVec.addElement( ratingItemID );
            }
            ratingCount ++;
            contenderGR.add( r );
        }
}
package com.launch.rm.lc.SimilaritiesEngine;
import com.launch.rm.lc.PlaylistGenerator.Constants;
import java.util.Vector;
import java.io.*;
import java.sql.ResultSet;
/**
 * This class generates a file containing items and their similar
 * items. This is for debug purposes only; components used in the
 * calculations of the similarities are printed out.
 *
 * @author   John Veilleux
 */
public class DataFileGenerator
{
    private final static int MAX_ITEMS_TO_WRITE = 100;
```

-continued

```
    private final static int MAX_SIMILAR_ITEMS_PER_ITEM = 10;
    private final static String OUTPUT_FILENAME_ROOT = "\\export\\";
    private final static String OUTPUT_FILENAME_SUFFIX = "Similarities.txt";
    private final static String TYPE_STRING[] = { "Artist", "Song", "Album", "Artist" };
    static
    {
        System.setErr( System.out );
    }
    public static void main( String args[] )
    {
        Integer itemID;
        Byte itemType;
        Byte ratingType;
        SimilaritiesEngine engine;
        Vector itemIDVec;
        OrderedList groupRatingList;
        ResultSet rs;
        PrintWriter writer;
        GroupRating gRating;
        double gRatingValue;
        String headerStr1;
        String headerStr2;
        String itemSQL;
        String ratingSQL;
        String itemParamStr1;
        String itemParamStr2;
        String ratingParamStr1;
        String ratingParamStr2;
        itemID = null;
        itemType = null;
        ratingType = null;
        engine = null;
        itemIDVec = new Vector( );
        groupRatingList = null;
        rs = null;
        writer = null;
        gRating = null;
        gRatingValue = 0;
        headerStr1 = null;
        headerStr2 = null;
        itemSQL = null;
        ratingSQL = null;
        itemParamStr1 = null;
        itemParamStr2 = null;
        ratingParamStr1 = null;
        ratingParamStr2 = null;
        try
        {
            switch ( args.length )
            {
                case 2
                :
                    ratingType = new Byte( args[ 1 ] );
                    if ( ratingType.byteValue( ) < Constants.ITEM_TYPE_SONG || ratingType.byteValue( ) > Constants.ITEM_TYPE_ARTIST )
                    {
                        throw new Exception( "Rating type must be " + Constants.ITEM_TYPE_SONG + ", " + Constants.ITEM_TYPE_ALBUM + ", or " + Constants.ITEM_TYPE_ARTIST + "." );
                    }
                case 1
                :
                    itemType = new Byte( args[ 0 ] );
                    if ( itemType.byteValue( ) < Constants.ITEM_TYPE_SONG || itemType.byteValue( ) > Constants.ITEM_TYPE_ARTIST )
                    {
                        throw new Exception( "Item type must be " + Constants.ITEM_TYPE_SONG + ", " + Constants.ITEM_TYPE_ALBUM + ", or " + Constants.ITEM_TYPE_ARTIST + "." );
                    }
                    break;
                default
                :
                    throw new InstantiationException( );
            }
            if ( ratingType != null && itemType.byteValue( ) == ratingType.byteValue( ) )
```

-continued

```
            {
                throw new Exception( "Item type cannot be equal to rating
type." );
            }
            Debugger.out( "DataFileGenerator started." );
            Debugger.resetTimer( "DataFileGenerator" );
            switch ( itemType.intValue( ) )
            {
                case Constants.ITEM_TYPE_SONG
                    :
                        itemSQL = "exec sp_lcGetSongDetail_xsxx ";
                        itemParamStr1 = "title";
                        itemParamStr2 = "artist";
                        break;
                case Constants.ITEM_TYPE_ALBUM
                    :
                        itemSQL = "exec sp_lcGetAlbumDetail_xsxx ";
                        itemParamStr1 = "albumName";
                        itemParamStr2 = "artistName";
                        break;
                case Constants.ITEM_TYPE_ARTIST
                    :
                        itemSQL = "exec sp_lcGetArtistInfo_xsxx ";
                        itemParamStr1 = "artist";
                        break;
            }
            if ( ratingType == null )
            {
                engine = new SimilaritiesEngine( itemType.byteValue( ),
MAX_ITEMS_TO_WRITE );
                writer = new PrintWriter( new FileWriter(
OUTPUT_FILENAME_ROOT + TYPE_STRING[ itemType.intValue( ) ] +
OUTPUT_FILENAME_SUFFIX ) );
                headerStr1 = TYPE_STRING[ itemType.intValue( ) ] + "s
similar to (";
                ratingSQL = itemSQL;
                ratingParamStr1 = itemParamStr1;
                ratingParamStr2 = itemParamStr2;
            }
            else
            {
                engine = new SimilaritiesEngine( itemType.byteValue( ),
ratingType.byteValue( ), MAX_ITEMS_TO_WRITE );
                writer = new PrintWriter( new FileWriter(
OUTPUT_FILENAME_ROOT + TYPE_STRING[ itemType.intValue( ) ] +
TYPE_STRING[ ratingType.intValue( ) ] + OUTPUT_FILENAME_SUFFIX ) );
                headerStr1 = TYPE_STRING[ ratingType.intValue( ) ] + "s
similar to " + TYPE_STRING[ itemType.intValue( ) ] + " (";
                switch ( ratingType.intValue( ) )
                {
                    case Constants.ITEM_TYPE_SONG
                        :
                            ratingSQL = "exec sp_lcGetSongDetail_xsxx ";
                            ratingParamStr1 = "title";
                            ratingParamStr2 = "artist";
                            break;
                    case Constants.ITEM_TYPE_ALBUM
                        :
                            ratingSQL = "exec sp_lcGetAlbumDetail_xsxx ";
                            ratingParamStr1 = "albumName";
                            ratingParamStr2 = "artistName";
                            break;
                    case Constants.ITEM_TYPE_ARTIST
                        :
                            ratingSQL = "exec sp_lcGetArtistInfo_xsxx ";
                            ratingParamStr1 = "artist";
                            break;
                }
            }
            itemIDVec = engine.getItemIDs( );
            for ( int i = 0; i < itemIDVec.size( ); i ++ )
            {
                itemID = (Integer) itemIDVec.elementAt( i );
                headerStr2 = headerStr1 + itemID + ") ";
                rs = DBConnection.executeSQL( itemSQL + itemID, false );
                if ( rs.next( ) )
                {
                    headerStr2 += rs.getString( itemParamStr1 );
                    if ( itemParamStr2 != null )
```

-continued

```
                    {
                            headerStr2 += " by " + rs.getString(
itemParamStr2 );
                    }
                }
                rs.close( );
                writer.println( headerStr2 );
                groupRatingList = engine.getSimilar( itemID,
MAX__SIMILAR__ITEMS__PER__ITEM );
                for ( int j = 0; j < groupRatingList.size( ); j ++ )
                {
                        gRating = (GroupRating) groupRatingList.elementAt( j
);
                        gRatingValue = groupRatingList.valueAt( j );
                        writer.print( "\t" + gRating.toBigString( ) + "\t" );
                        rs = DBConnection.executeSQL( ratingSQL +
gRating, false );
                        if ( rs.next( ) )
                        {
                                writer.print( rs.getString( ratingParamStr1 ) );
                                if ( ratingParamStr2 != null )
                                {
                                        writer.print( "\t" + rs.getString(
ratingParamStr2 ) );
                                }
                        }
                        rs.close( );
                        writer.println( );
                }
                writer.println( );
                Debugger.out( "Generated " + groupRatingList.size( ) + "
similarities for item " + itemID );
            }
            writer.close( );
            Debugger.outTimerMIN( "DataFileGenerator", "DataFileGenerator
done." );
        }
        catch ( InstantiationException ie )
        {
            System.out.println( );
            System.out.println( "usage:" );
            System.out.println( " java DataFileGenerator [item type]" );
            System.out.println( " java DataFileGenerator [item type] [rating
type]" );
        }
        catch ( Exception e )
        {
            e.printStackTrace( );
        }
    }
}
package com.launch.rm.lc.SimilaritiesEngine;
import com.inet.tds.TdsDriver;
import com.launch.rm.lc.PlaylistGenerator.Constants;
import java.sql.*;
import java.util.*;
/**
 * A database connection. Carries out database operations such as executing
 * SQL queries. There is only one static connection object, which can
 * create multiple statements for executing SQL and return multiple
 * result sets.
 *
 * @author Jeff Boulter
 * @author John Veilleux
 */
public class DBConnection
{
    private final static String DEFAULT__CONN__ID = "DEFAULT";
    private static Driver dbDriver = null;
    private static Hashtable connHash = new Hashtable( );
    private static Hashtable connectStrHash = new Hashtable( );
    static
    {
        connectStrHash.put( DEFAULT__CONN__ID, "jdbc:inetdae:"
                + Constants.DB__SERVER
                + ":"
                + Constants.DB__PORT
                + "?sql7=true&database="
                + Constants.DB__DBNAME
```

-continued

```
                + "&user="
                + Constants.DB_USERNAME
                + "&password="
                + Constants.DB_PASSWORD );
    }
    /**
     * Adds a database connection ID and info to the pool.
     *
     * @param    connIDStr    the ID of the new connection
     * @param    connectStr   the connection info
     */
    public final static void addConnection( String connIDStr, String connectStr )
    {
        connectStrHash.put( connIDStr, connectStr );
    }
    /**
     * Initializes the Connection object and adds it to the pool,
     * or does nothing if the object is already initialized,
     * then returns it.
     *
     * @exception    SQLException    if a connection error occurs
     */
    private final static Connection initConnection( String connIDStr ) throws
SQLException
    {
        Connection conn;
        String url;
        conn = (Connection) connHash.get( connIDStr );
        url = (String) connectStrHash.get( connIDStr );
        if ( dbDriver == null )
        {
            dbDriver = new com.inet.tds.TdsDriver( );
        }
        if ( dbDriver != null && url != null && ( conn == null || conn.isClosed( ) ) )
        {
            conn = dbDriver.connect( url, null );
            connHash.put( connIDStr, conn );
        }
        return conn;
    }
    /**
     * Executes an SQL query.
     *
     * @param    sql         the query to execute
     * @param    printSQL    determines whether or not to print debug info
     *
     * @return               the result set for the query, or null if
     *                       an error occurs
     */
    public final static ResultSet executeSQL( String sql, boolean printSQL )
    {
        return executeSQL( DEFAULT_CONN_ID, sql, printSQL );
    }
    /**
     * Executes an SQL query.
     *
     * @param    sql         the query to execute
     * @param    printSQL    determines whether or not to print debug info
     *
     * @return               the result set for the query, or null if
     *                       an error occurs
     */
    public final static ResultSet executeSQL( String connIDStr, String sql, boolean
printSQL )
    {
        Connection conn;
        ResultSet rs;
        Statement st;
        conn = null;
        rs = null;
        st = null;
        // if we don't have a query, don't run it--it'll hang
        if ( sql.length( ) <= 0 )
        {
            System.err.println( new java.util.Date( ) + "
DBConnection.executeSQL: can't run empty SQL query." );
            return null;
        }
        if ( printSQL )
```

```
        {
                System.out.println( "Running SQL: " + sql );
        }
        try
        {
                conn = initConnection( connIDStr );
                st = conn.createStatement( );
                st.execute( sql );
                rs = st.getResultSet( );
        }
        catch ( SQLException sqle )
        {
                System.err.println( new java.util.Date( ) + " Error running SQL: " +
sql );
                sqle.printStackTrace( );
        }
        return rs;
}
/**
 * Executes an SQL update.
 *
 * @param   sql          the update to execute
 * @param   printSQL     determines whether or not to print debug info
 */
public final static void executeUpdate( String sql, boolean printSQL )
{
        executeUpdate( DEFAULT_CONN_ID, sql, printSQL );
}
/**
 * Executes an SQL update.
 *
 * @param   sql          the update to execute
 * @param   printSQL     determines whether or not to print debug info
 */
public final static void executeUpdate( String connIDStr, String sql, boolean
printSQL )
{
        Connection conn;
        Statement st;
        conn = null;
        st = null;
        // if we don't have a query, don't run it--it'll hang
        if ( sql.length( ) <= 0 )
        {
                System.err.println( new java.util.Date( ) + "
DBConnection.executeUpdate: can't run empty SQL query." );
                return;
        }
        if ( printSQL )
        {
                System.out.println( "Running SQL: " + sql );
        }
        try
        {
                conn = initConnection( connIDStr );
                st = conn.createStatement( );
                st.executeUpdate( sql );
        }
        catch ( SQLException sqle )
        {
                System.err.println( new java.util.Date( ) + " Error running SQL: " +
sql );
                sqle.printStackTrace( );
        }
}
/**
 * Gets a DBPreparedStatement object given an SQL query.
 *
 * @param      sql                 the query to prepare
 *
 * @return                         the prepared statement
 *
 * @exception  SQLException     if a database error occurs
 */
public final static PreparedStatement prepareStatement( String sql ) throws
SQLException
{
        return prepareStatement( DEFAULT_CONN_ID, sql );
}
```

```
/**
 * Gets a DBPreparedStatement object given an SQL query.
 *
 * @param     sql              the query to prepare
 *
 * @return                     the prepared statement
 *
 * @exception  SQLException    if a database error occurs
 */
public final static PreparedStatement prepareStatement( String connIDStr, String sql ) throws SQLException
{
    PreparedStatement ps;
    Connection conn;
    ps = null;
    conn = initConnection( connIDStr );
    if ( conn != null )
    {
        ps = conn.prepareStatement( sql );
    }
    return ps;
}
/**
 * Closes a single database connection. It is removed from
 * the pool of connections.
 *
 * @param     connIDStr    the connection ID
 */
public final static void closeConnection( String connIDStr )
{
    Connection conn;
    conn = (Connection) connHash.get( connIDStr );
    try
    {
        connHash.remove( connIDStr );
        if ( conn != null )
        {
            conn.close( );
        }
    }
    catch ( Exception e )
    {
        e.printStackTrace( );
    }
}
/**
 * Closes all database connections in the pool.
 */
public final static void closeAllConnections( )
{
    Connection conn;
    String connIDStr;
    conn = null;
    connIDStr = null;
    for ( Enumeration enum = connHash.keys( ); enum.hasMoreElements( ); )
    {
        try
        {
            connIDStr = (String) enum.nextElement( );
            conn = (Connection) connHash.get( connIDStr );
            connHash.remove( connIDStr );
            conn.close( );
        }
        catch ( Exception e )
        {
            e.printStackTrace( );
        }
    }
}
}
package com.launch.rm.lc.SimilaritiesEngine;
import java.util.Hashtable;
import java.io.*;
/**
 * This class handles all debugging functions, such as debug output,
 * for the SimilaritiesEngine package.
 *
 * @author John Veilleux
 */
```

```
public class Debugger
{
    private static Hashtable timerHash = new Hashtable( );
    private static PrintStream outStream = new PrintStream( System.out );
    static
    {
        if ( SimilaritiesConstants.DEBUG && SimilaritiesConstants.LOGFILE )
        {
            try
            {
                outStream = new PrintStream( new FileOutputStream( "SimilaritiesLog.txt" ) );
            }
            catch ( Exception e )
            {
                System.err.println( "Could not create log file...debug info will be printed to standard out." );
            }
        }
    }
    /**
     * Outputs the given message if debug mode is on.
     *
     * @param    message          the message to print
     */
    public final static void out( String message )
    {
        if ( SimilaritiesConstants.DEBUG )
        {
            outStream.println( "DEBUGGER: " + message );
        }
    }
    /**
     * Outputs the given message with the current timer value in
     * both milliseconds and minutes if debug mode is on.
     *
     * @param    timerKey        the timer ID
     * @param    message         the message to print
     */
    public final static void outTimer( Object timerKey, String message )
    {
        if ( SimilaritiesConstants.DEBUG )
        {
            if ( timerHash.get( timerKey ) != null )
            {
                outStream.println( "DEBUGGER (" + getTimerMS( timerkey ) + " MS or " + getTimerMIN( timerKey ) + " MIN): " + message );
            }
            else
            {
                outStream.println( "DEBUGGER (NO TIMER FOUND): " + message );
            }
        }
    }
    /**
     * Outputs the given message with the current timer value in
     * milliseconds if debug mode is on.
     *
     * @param    timerKey        the timer ID
     * @param    message         the message to print
     */
    public final static void outTimerMS( Object timerKey, String message )
    {
        if ( SimilaritiesConstants.DEBUG )
        {
            if ( timerHash.get( timerkey ) != null )
            {
                outStream.println( "DEBUGGER (" + getTimerMS( timerKey ) + " MS): " + message );
            }
            else
            {
                outStream.println( "DEBUGGER (NO TIMER FOUND): " + message );
            }
        }
    }
    /**
```

-continued

```
    * Outputs the given message with the current timer value in
    * minutes if debug mode is on.
    *
    * @param    timerKey      the timer ID
    * @param    message       the message to print
    */
    public final static void outTimerMIN( Object timerkey, String message )
    {
        if ( SimilaritiesConstants.DEBUG )
        {
            if ( timerHash.get( timerKey ) != null )
            {
                outStream.println( "DEBUGGER (" + getTimerMIN( timerKey
) + " MIN):" + message );
            }
            else
            {
                outStream.println( "DEBUGGER (NO TIMER FOUND): " +
message );
            }
        }
    }
    /**
    * Resets the timer.
    *
    * @param    timerKey      the timer ID
    */
    public final static void resetTimer( Object timerKey )
    {
        timerHash.put( timerKey, new Long( System.currentTimeMillis( ) ) );
    }
    /**
    * Gets the timer's current value in milliseconds.
    *
    * @param    timerkey      the timer ID
    *
    * @return                 the timer's value in milliseconds
    */
    public final static long getTimerMS( Object timerKey )
    {
        Long timerMS;
        timerMS = (Long) timerHash.get( timerKey );
        return System.currentTimeMillis( ) - timerMS.longValue( );
    }
    /**
    * Gets the timer's current value in minutes.
    *
    * @param    timerKey      the timer ID
    *
    * @return                 the timer's value in minutes
    */
    public final static int getTimerMIN( Object timerKey )
    {
        Long timerMS;
        timerMS = (Long) timerHash.get( timerKey );
        return (int) ( ( System.currentTimeMillis( ) - timerMS.longValue( ) ) / 60000
);
    }
}
package com.launch.rm.lc.SimilaritiesEngine;
/**
* This class calculates the group rating for a single item. The
* value is calculated by multiplying the total number of ratings
* by the sum of the average of the ratings with some specified
* offset.
*
* @author Jeff Boulter
* @author John Veilleux
*/
public class GroupRating
{
    private int itemID;
    private int numRatings = 0;
    private int ratingsSum = 0;
    private double value = 0;
    private double average = 0;
    private boolean state = true;
    /**
    * Creates a GroupRating object.
```

```
     *
     * @param    itemID the item ID
     */
    public GroupRating( int itemID )
    {
        this.itemID = itemID;
    }
    /**
     * Gets the item ID associated with this group rating.
     *
     * @return   the item ID
     */
    public int getItemID( )
    {
        return itemID;
    }
    /**
     * Adds a rating to be used in the calculation of this object's
     * value.
     *
     * @param    r    the rating
     */
    public void add( Rating r )
    {
        numRatings ++;
        ratingsSum += r.value;
        stale = true;
    }
    /**
     * Gets the final value of this object. If the value hasn't
     * been calculated yet, it is calculated and then returned.
     *
     * @return   this object's value
     */
    public double get( )
    {
        if ( stale )
        {
            calculate( );
        }
        return value;
    }
    /**
     * Gets the number of ratings added to this object.
     *
     * @return   the rating count
     */
    public int getNumRatings( )
    {
        return numRatings;
    }
    /**
     * Gets a String representation of this object.
     *
     * @return   the String description
     */
    public String toString( )
    {
        return String.valueOf( itemID );
    }
    /**
     * Gets a more complete String representation of this object.
     *
     * @return   the String description
     */
    public String toBigString( )
    {
        return "itemID: " + itemID + ", # of ratings: " + numRatings + ", sum of
ratings: " + ratingsSum + ", average: " + average( ) + ", score: " + get( );
    }
    /**
     * Gets the average value of all of this object's ratings.
     *
     * @return   the rating average
     */
    private double average( )
    {
        if ( stale )
        {
```

```
                if ( numRatings <= 0 )
                {
                    average = 0;
                }
                else
                {
                    average = ( (double)ratingsSum ) / ( (double)numRatings );
                }
            }
            return average;
        }
    /**
     * Calculates the value for this object.
     */
    private void calculate( )
        {
            value = num Ratings  * ( average( ) +
SimilaritiesConstants.GR__AVG__OFFSET );
            stale = false;
        }
}
package com.launch.rm.lc.SimilaritiesEngine;
import java.util.Vector;
/**
 * This class represents a list of OrderedElement objects. They
 * are sorted from highest to lowest value using quicksort. The
 * sorting is done on demand whenever any information contained in
 * this object is accessed.
 *
 * @author Jeff Boulter
 * @author John Veilleux
 */
public class OrderedList
{
    private Vector list;
    private boolean sorted = false;
    /**
     * This inner class represents an element used by OrderedList. It contains
     * two fields that are accessed directly: a value and an associated
     * object. OrderedList sorts these objects by the value field.
     */
    private class OrderedElement
    {
        private double value;
        private Object thing;
        /**
         * Creates an OrderedElement object.
         *
         * @param   value this object's value
         * @param   thing the object associated with the given value
         */
        private OrderedElement( double value, Object thing )
        {
            this.value = value;
            this.thing = thing;
        }
    }
    /**
     * Creates an OrderedList object.
     */
    public OrderedList( )
    {
            list = new Vector( );
    }
    /**
     * Creates an OrderedList object with an initial size.
     *
     * @param   size   the initial size
     */
    public OrderedList( int size )
    {
        list = new Vector( size );
    }
    /**
     * Creates an OrderedList object with an initial size and a
     * capacity increment.
     *
     * @param   size                    the initial size
     * @param   capacityIncrement the capacity increment
```

```
*/
public OrderedList( int size, int capacityIncrement )
{
    list = new Vector( size, capacityIncrement );
}
/**
 * Gets the object at the specified index.
 *
 * @param   int     the index position of the object
 *
 * @return          the object, or null if no object could be
 *                  retrieved at the given index
 */
public Object elementAt( int i )
{
    Object obj = null;
    OrderedElement e = null;
    if( !sorted )
    {
        sort( );
    }
    e = (OrderedElement) list.elementAt( i );
    if ( e != null )
    {
        obj = e.thing;
    }
    return obj;
}
/**
 * Gets the value at the specified index.
 *
 * @param   i       the index position of the value
 *
 * @return          the value, or null if no value could be
 *                  retrieved at the given index
 */
public double valueAt( int i )
{
    double value = 0;
    OrderedElement e = null;
    if ( !sorted )
    {
        sort( );
    }
    e = (OrderedElement) list.elementAt( i );
    if ( e != null )
    {
        value = e.value;
    }
    return value;
}
/**
 * Gets the number of elements in the list.
 *
 * @return   the list size
 */
public int size( )
{
    return list.size( );
}
/**
 * Truncates the list to the specified size. Nothing happens
 * if the list is already equal to or smaller than the given
 * size.
 *
 * @param   size    the maximum size
 */
public void trimToMaximumSize( int size )
{
    if( !sorted )
    {
        sort( );
    }
    if ( list.size( ) > size )
    {
        list.setSize( size );
    }
}
/**
```

```
 * Gets this list as a Vector of the objects associated with
 * each element in this list.
 *
 * @return   the Vector of objects
 */
public Vector asVector( )
{
    Vector result = new Vector( );
    if ( !sorted )
    {
        sort( );
    }
    for ( int i = 0; i < list.size( ); i ++ )
    {
        result.addElement( elementAt( i ) );
    }
    return result;
}
/**
 * Gets a String representation of this object.
 *
 * @return   the String description
 */
public String toString( )
{
    String result = "(";
    if ( !sorted )
    {
        sort( );
    }
    for ( int i = 0; i < list.size( ); i ++ )
    {
        result += elementAt( i ) + ", ";
    }
    result + = ")";
    return result;
}
/**
 * Adds a value/object pair to the list.
 *
 * @param   value the value
 * @param   object the object
 */
public void add( double value, Object toStore )
{
    list.addElement( new OrderedElement( value, toStore ) );
    sorted = false;
}
/**
 * Removes an element from the list.
 *
 * @param   index the index of the element to remove
 */
public void removeElementAt( int index )
{
    list.removeElementAt( index );
}
/**
 * Sorts this object.
 */
private void sort( )
{
    sort( list, 0, list.size( ) – 1 );
    sorted = true;
}
/**
 * Performs quick sort on a vector.
 *
 * @param   a      the vector to sort
 * @param   from   the starting index for the sort
 * @param   to     the ending index for the sort
 */
private final static void sort( Vector a, int from, int to )
{
    int i = from;
    int j = to;
    OrderedElement center = null;
    OrderedElement temp = null;
    if ( a == null || a.size( ) < 2 )
```

```
            {
                    return;
            }
            center = (OrderedElement) a.elementAt( ( from + to ) / 2 );
            do
            {
                    while ( i < to && center.value < ( (OrderedElement) a.elementAt( i )
).value )
                    {
                            i ++;
                    }
                    while ( j > from && center.value > ( (OrderedElement) a.elementAt(
j ) ).value )
                    {
                            j --;
                    }
                    if ( i < j )
                    {
                            // swap elements
                            temp = (OrderedElement) a.elementAt( i );
                            a.setElementAt( a.elementAt( j ), i );
                            a.setElementAt( temp, j );
                    }
                    if ( i <= j )
                    {
                            i ++;
                            j --;
                    }
            }
            while( i <= j );
            if ( from < j )
            {
                    sort( a, from, j );
            }
            if ( i < to )
            {
                    sort( a, i, to );
            }
        }
}
package com.launch.rm.lc.SimilaritiesEngine;
/**
 * This class represents a rating. It includes three fields: an item
 * ID, a user ID, and a value. The fields are accessed directly.
 *
 * @author Jeff Boulter
 * @author John Veilleux
 */
public class Rating
{
        public int itemID;
        public int userID;
        public byte value;
        /**
         * Creates a Rating object.
         *
         * @param   itemID   the ID of the item this rating is for
         * @param   userID   the ID of the user who created the rating
         * @param   value    the actual rating value
         */
        public Rating( int itemID, int userID, byte value )
        {
                this.itemID = itemID;
                this.userID = userID;
                this.value = value;
        }
        /**
         * Gets a String representation of this object.
         *
         * @return   the String description
         */
        public String toString( )
        {
                return "Rating: [itemID: " + itemID + ", userID: " + userID + ", value: " +
value + "]";
        }
}
package com.launch.rm.lc.SimilaritiesEngine;
import com.launch.utils.PropertiesFileReader;
```

-continued

```
/**
 * Constants used within the SimilaritiesEngine code. Changing
 * certain parameters can significantly change the amount of memory
 * used. For instance, each rating loaded into the engine uses about
 * 30 bytes of memory, so increasing MAX_RATINGS_IN_ENGINE by 1
 * million ratings could potentially use an extra 30 MB of memory.
 * Each fan under MAX_FANS_PER_ITEM uses about 23 bytes, so
 * MAX_ITEMS_TO_STORE times MAX_FANS_PER_ITEM times 23 bytes gives
 * you the potential maximum amount of memory taken up by those
 * parameters. The ITEM_TO_ARTIST_CACHE_MAX_SIZE entries each use
 * up about 71 bytes of memory. A cache with 15,000 entries will
 * use about 1 MB of memory.
 *
 * @author Jeff Boulter
 * @author John Veilleux
 */
public class SimilaritiesConstants
{
    private final static PropertiesFileReader pfr = new PropertiesFileReader(
"SimilaritiesConstants.properties" );
    private static int maxRatingsInEngine;
    private static String fileNames[ ] = { "", "", "", "" };
    private static long updateSimilaritiesTimeMS;
    private static short maxItemsToStore[ ] = { 0, 0, 0, 0 };
    private static int maxSimilarItemsPerItem;
    private static byte fanThreshold;
    private static int maxFansPerItem;
    private static int minFansForRecommendedItem;
    private static int grAvgOffset;
    private static int itemToArtistCacheMaxSize[ ] = { 0, 0, 0, 0 };
    private static boolean debug;
    private static boolean logfile;
    static
    {
        maxRatingsInEngine = pfr.getIntProperty( "MAX_RATINGS_IN_ENGINE",
30000000 );
        fileNames[ 1 ] = pfr.getProperty( "SONG_RATINGS_FILE",
"\\export\\songratings.txt" );
        fileNames[ 2 ] = pfr.getProperty( "ALBUM_RATINGS_FILE",
"\\export\\albumratings.txt" );
        fileNames[ 3 ] = pfr.getProperty( "ARTIST_RATINGS_FILE",
"\\export\\artistratings.txt" );
        fileNames[ 0 ] = fileNames[ 3 ];
        updateSimilaritiesTimeMS = pfr.getLongProperty(
"UPDATE_SIMILARITIES_TIME_MS", 1000 * 60 * 60 * 24 * 14 );
        maxItemsToStore[ 1 ] = pfr.getShortProperty(
"MAX_SONGS_TO_STORE", (short)15000 );
        maxItemsToStore[ 2 ] = pfr.getShortProperty(
"MAX_ALBUMS_TO_STORE", (short)10000 );
        maxItemsToStore[ 3 ] = pfr.getShortProperty(
"MAX_ARTISTS_TO_STORE", (short)3000 );
        maxItemsToStore[ 0 ] = maxItemsToStore[ 3 ];
        maxSimilarItemsPerItem = pfr.getIntProperty(
"MAX_SIMILAR_ITEMS_PER_ITEM", 100 );
        fanThreshold = pfr.getByteProperty( "FAN_THRESHOLD", (byte)90 );
        maxFansPerItem = pfr.getIntProperty( "MAX_FANS_PER_ITEM", 300 );
        minFansForRecommendedItem = pfr.getIntProperty(
"MIN_FANS_FOR_RECOMMENDED_ITEM", 4 );
        grAvgOffset = pfr.getIntProperty( "GR_AVG_OFFSET", -70 );
        itemToArtistCacheMaxSize[ 1 ] = pfr.getIntProperty(
"SONG_TO_ARTIST_CACHE_MAX_SIZE", 300000 );
        itemToArtistCacheMaxSize[ 2 ] = pfr.getIntProperty(
"ALBUM_TO_ARTIST_CACHE_MAX_SIZE", 150000 );
        debug = pfr.getBooleanProperty( "DEBUG", true );
        logfile = pfr.getBooleanProperty( "LOGFILE", false );
    }
    // the maximum number of ratings that the engine can load without
    // running out of memory
    public final static int MAX_RATINGS_IN_ENGINE = maxRatingsInEngine;
    // the file names for the corresponding item type
    // the array is indexed as { 0 = default (artists), 1 = songs, 2 = albums, 3 = artists
}
    public final static String FILE_NAMES[ ] = fileNames;
    // the expiration time for similarities in the database
    public final static long UPDATE_SIMILARITIES_TIME_MS =
updateSimilaritiesTimeMS;
    // the maximum number of items with similar items to be stored in the database
    // the array is indexed as { 0 = default (artists), 1 = songs, 2 = albums, 3 = artists
}
```

-continued

```java
    public final static short MAX_ITEMS_TO_STORE[ ] = maxItemsToStore;
    // the maximum number of similar items to retrieve per item
    public final static int MAX_SIMILAR_ITEMS_PER_ITEM =
maxSimilarItemsPerItem;
    // the user's minimum rating for an item to be considered a fan
    public final static byte FAN_THRESHOLD = fanThreshold;
    // maximum number of fans to get for an item
    public final static int MAX_FANS_PER_ITEM = maxFansPerItem;
    // the minimum number of ratings an item needs to be considered as a similar
item
    public final static int MIN_FANS_FOR_RECOMMENDED_ITEM =
minFansForRecommendedItem;
    // used when calculating the average part of a group rating
    public final static int GR_AVG_OFFSET = grAvgOffset;
    // used to determine the maximum size of the cache that maps
    // item ID's to artist ID's
    // the array is indexed as { 0 = default (artists), 1 = songs, 2 = albums, 3 = artists
}
    public final static int ITEM_TO_ARTIST_CACHE_MAX_SIZE[ ] =
itemToArtistCacheMaxSize;
    // determines whether or not to print debug output
    public final static boolean DEBUG = debug;
    // in debug mode, determines whether to print debug info to a
    // file or to the screen
    public final static boolean LOGFILE = logfile;
}
package com.launch.rm.lc.SimilaritiesEngine;
import com.launch.rm.lc.PlaylistGenerator.*;
import java.util.*;
import java.io.*;
import java.sql.*;
/**
 * This class represents the engine which churns out the item
 * similarities. The files from which the ratings are pulled must
 * be grouped by user.
 *
 * @author Jeff Boulter
 * @author John Veilleux
 */
public class SimilaritiesEngine
{
    private byte itemType = 0;
    private Hashtable userRatingsHash = new Hashtable( );
    private Hashtable itemToFanIDsHash = new Hashtable( );
    private Hashtable itemToArtistCache = null;
    private final static String CACHE_CONN_ID = "CACHE";
    static
    {
        DBConnection.addConnection( CACHE_CONN_ID, "jdbc:inetdae:"
            + Constants.DB_SERVER
            + ":"
            + Constants.DB_PORT
            + "?sql7=true"
            + "&database=dbLaunchProd"
            + "&user="
            + Constants.DB_USERNAME
            + "&password="
            + Constants.DB_PASSWORD );
    }
    /**
     * Creates a SimilaritiesEngine object.
     *
     * @param    itemType    the item type for which similarities will
     *                       be generated
     *
     * @param    numItems    the number of items that will have
     *                       similarities generated for them
     */
    public SimilaritiesEngine( byte itemType, int numItems )
    {
        IntHash itemsToExclude;
        LineNumberReader reader;
        String line;
        StringTokenizer st;
        int itemID;
        int userID;
        byte rating;
        Vector userRatings;
        int lastUserID;
```

-continued

```
        boolean lastUserWasFan;
        int randomStartLine;
        int numItemsWithMaxFans;
        boolean allFansLoaded;
        Vector fanIDsVec;
        int numFileRatings[ ];
        int portionToLoad;
        int totalRatingsLoaded;
        this.itemType = itemType;
        itemsToExclude = null;
        reader = null;
        line = null;
        st = null;
        itemID = 0;
        userID = 0;
        rating = 0;
        userRatings = null;
        lastUserID = -1;
        lastUserWasFan = false;
        randomStartLine = 0;
        numItemsWithMaxFans = 0;
        allFansLoaded = false;
        fanIDsVec = null;
        itemToArtistCache = new Hashtable(
SimilaritiesConstants.ITEM_TO_ARTIST_CACHE_MAX_SIZE[ itemType ] );
        numFileRatings = new int[ ]{ 0 };
        portionToLoad = 1;
        totalRatingsLoaded = 0;
        try
        {
            itemsToExclude = getItemsToExclude( itemType );
            Debugger.out( "There were " + itemsToExclude.size( ) + " items that
already had similarities in the database and don't need to be updated yet." );
            Debugger.out( "Now getting items with the most total ratings..." );
            Debugger.resetTimer( "getItemsWithMostRatings" );
            itemToFanIDsHash = getItemsWithMostRatings( itemType,
numItems, itemsToExclude, numFileRatings );
            Debugger.outTimer( "getItemsWithMostRatings", "Done getting
items with the most total ratings. # of items: " + itemToFanIDsHash.size( ) );
            portionToLoad = ( numFileRatings [ 0 ] /
SimilaritiesConstants.MAX_RATINGS_IN_ENGINE ) + 1;
            randomStartLine = (int) Util.random( numFileRatings[ 0 ] ) + 1;
            reader = new LineNumberReader( new FileReader(
SimilaritiesConstants.FILE_NAMES[ itemType ] ) );
            Debugger.out( "Engine will load no more than 1/" + portionToLoad
+ " of " + numFileRatings[ 0 ] + " total ratings in file." );
            Debugger.out( "Starting to read ratings file up through random line "
+ randomStartLine );
            for ( int i = 1; i <= randomStartLine; i ++ )
            {
                line = reader.readLine( );
            }
            Debugger.out( "Done reading file up through random line " +
randomStartLine );
            Debugger.out( "Now queuing up file to first line of next user..." );
            line = readUpToNextUser( line, reader );
            randomStartLine = reader.getLineNumber( );
            if ( line == null )
            {
                reader = new LineNumberReader( new FileReader(
SimilaritiesConstants.FILE_NAMES[ itemType ] ) );
                line = reader.readLine( );
                randomStartLine = reader.getLineNumber( );
            }
            Debugger.out( "Done queuing up file to first line of next user." );
            Debugger.out( "Now loading ratings into engine..." );
            Debugger.resetTimer( toString( ) );
            do
            {
                if ( reader.getLineNumber( ) % portionToLoad == 0 )
                {
                    st = new StringTokenizer( line, "," );
                    itemID = Integer.parseInt( st.nextToken( ) );
                    userID = Integer.parseInt( st.nextToken( ) );
                    rating = Byte.parseByte( st.nextToken( ) );
                    if ( userID != lastUserID )
                    {
                        if ( lastUserWasFan )
                        {
```

```
                                lastUserWasFan = false;
                                userRatingsHash.put( new Integer(
lastUserID ), userRatings );
                                totalRatingsLoaded +=
userRatings.size( );
                            }
                            lastUserID = userID;
                            allFansLoaded = numItemsWithMaxFans ==
numItems;
                            userRatings = new Vector( );
                        }
                        userRatings.addElement( new Rating( itemID, userID,
rating ) );
                        if ( rating >= SimilaritiesConstants.FAN_THRESHOLD
)
                        {
                            fanIDsVec = (Vector) itemToFanIDsHash.get(
new Integer( itemID ) );
                            if ( fanIDsVec != null && fanIDsVec.size( ) <
SimilaritiesConstants.MAX_FANS_PER_ITEM )
                            {
                                lastUserWasFan = true;
                                fanIDsVec.addElement( new Integer(
userID ) );
                                if ( fanIDsVec.size( ) ==
SimilaritiesConstants.MAX_FANS_PER_ITEM )
                                {
                                    numItemsWithMaxFans ++;
                                }
                            }
                        }
                    }
                    line = reader.readLine( );
                    if ( line == null )
                    {
                        Debugger.out( "Read past end of " +
SimilaritiesConstants.FILE_NAMES[ itemType ] );
                        reader.close( );
                        reader = new LineNumberReader( new FileReader(
SimilaritiesConstants.FILE_NAMES[ itemType ] ) );
                        line = reader.readLine( );
                    }
                }
                while ( !allFansLoaded && reader.getLineNumber( ) !=
randomStartLine );
                reader.close( );
                if ( lastUserWasFan )
                {
                    userRatingsHash.put( new Integer( userID ), userRatings );
                    totalRatingsLoaded += userRatings.size( );
                }
                Debugger.outTimer( toString( ), "Done loading " +
totalRatingsLoaded + " ratings into engine." );
                Debugger.out( numItemsWithMaxFans + " out of " +
itemToFanIDsHash.size( ) + " items had maximum of " +
SimilaritiesConstants.MAX_FANS_PER_ITEM + " fans." );
            }
            catch ( Exception e )
            {
                e.printStackTrace( );
            }
        }
        /**
         * Gets a sorted list of items similar to the given item. The
         * specified item ID must have been one of the candidates to
         * have similarities generated for it.
         *
         * @param    itemID     the ID of the item to get similar items for
         *
         * @return              the list of similar items, or an empty
         *                      list if the item ID wasn't included in the
         *                      similarities calculations
         */
        public OrderedList getSimilar( int itemID )
        {
            OrderedList result;
            Consensus c;
            Vector fanIDs;
            Vector userRatings;
```

```
            result = new OrderedList( );
            c = new Consensus( itemID );
            fanIDs = (Vector) itemToFanIDsHash.get( new Integer( itemID ) );
            userRatings = null;
            if( fanIDs != null )
            {
                for ( int i = 0; i < fanIDs.size( ); i ++ )
                {
                    userRatings = (Vector) userRatingsHash.get(
fanIDs.elementAt( i ) );
                    c.addRatings( userRatings );
                }
                result = c.poll( );
                if ( itemType == Constants.ITEM_TYPE_SONG )
                {
                    removeItemsWithSameArtist( itemID, result, "exec
sp_lcGetSongDetail_xsxx ", itemToArtistCache,
SimilaritiesConstants.ITEM_TO_ARTIST_CACHE_MAX_SIZE[ itemType ] );
                }
                else if ( itemType == Constants.ITEM_TYPE_ALBUM )
                {
                    removeItemsWithSameArtist( itemID, result, "exec
sp_lcGetAlbumDetail_xsxx ", itemToArtistCache,
SimilaritiesConstants.ITEM_TO_ARTIST_CACHE_MAX_SIZE[ itemType ] );
                }
            }
            else
            {
                Debugger.out( "The item with ID " + itemID + " was not one of the
items that had similarities calculated for it." );
            }
            return result;
    }
    /**
     * Gets a sorted list of items similar to the given item. The
     * specified item ID must have been one of the candidates to
     * have similarities generated for it.
     *
     * @param    itemID      the ID of the item to get similar items for
     * @param    maxItems    the maximum number of similar items to
     *                          retrieve
     *
     * @return               the list of similar items, or an empty
     *                          list if the item ID wasn't included in the
     *                          similarities calculations
     */
    public OrderedList getSimilar( int itemID, int maxItems )
    {
        OrderedList result;
        result = getSimilar( itemID );
        result.trimToMaximumSize( maxItems );
        return result;
    }
    /**
     * Gets all item ID's that need to have their similarities
     * generated.
     *
     * @return   the item ID's
     */
    public Vector getItemIDs( )
    {
        Vector idVec;
        idVec = new Vector( itemToFanIDsHash.size( ) );
        for ( Enumeration e = itemToFanIDsHash.keys( ); e.hasMoreElements( ); )
        {
            idVec.addElement( e.nextElement( ) );
        }
        return idVec;
    }
    /**
     * Gets an inthash of item ID's to exclude from similarities
     * generation.
     *
     * @param    type    the item type
     *
     * @return           the item ID's to exclude
     */
    private final static IntHash getItemsToExclude( byte type )
    {
```

```
            IntHash toExclude;
            ResultSet rs;
            Timestamp lastUpdatedTime;
            toExclude = new IntHash( );
            rs = null;
            lastUpdatedTime = null;
            try
            {
                rs = DBConnection.executeSQL( "exec
usp_a10xSimilar_GetAllSimilarItems_xsxx " + type, false );
                while ( rs.next( ) )
                {
                    lastUpdatedTime = rs.getTimestamp( "dateCreated" );
                    if ( System.currentTimeMillis( ) − lastUpdatedTime.getTime( )
< SimilaritiesConstants.UPDATE_SIMILARITIES_TIME_MS )
                    {
                        toExclude.increment( rs.getInt( "itemID" ) );
                    }
                }
            }
            catch ( Exception e )
            {
                e. printStackTrace( );
            }
            return toExclude;
        }
        /**
         * Gets a hashtable with item ID's as the keys and an empty
         * inthash for each item. There will only be up to specified
         * maximum number of item ID's in the hashtable, and they will
         * be chosen from most to least total ratings.
         *
         * @param    type             the item type
         * @param    maxItems         the maximum number of items to return
         *                            in the hashtable
         * @param    itemsToExclude   a group of item ID's to definitely
         *                            exclude from the returned
hashtable
         * @param    numLines         a one-element array for storing the
         *                            number of lines in the ratings file
         *
         * @return                    the hashtable of item ID's each with
         *                            an associated inthash
         */
        private final static Hashtable getItemsWithMostRatings( byte type, int maxItems,
IntHash itemsToExclude, int numLines[ ] )
        {
            Hashtable resultHash;
            LineNumberReader reader;
            StringTokenizer st;
            int itemID;
            IntHash numRatingsHash;
            OrderedList mostRatingsItemIDList;
            int resultSize;
            resultHash = new Hashtable( maxItems );
            reader = null;
            st = null;
            itemID = 0;
            numRatingsHash = new IntHash( );
            mostRatingsItemIDList = new OrderedList( );
            resultSize = 0;
            try
            {
                reader = new LineNumberReader( new FileReader(
SimilaritiesConstants.FILE_NAMES[ type ] ) );
                for ( String line = reader.readLine( ); line != null; line =
reader.readLine( ) )
                {
                    st = new StringTokenizer( line, "," );
                    itemID = Integer.parseInt( st.nextToken( ) );
                    if ( itemsToExclude.get( itemID ) == 0 )
                    {
                        numRatingsHash.increment( itemID );
                    }
                }
                numLines[ 0 ] = reader.getLineNumber( );
                for ( Enumeration e = numRatingsHash.keys( );
e.hasMoreElements( ); )
                {
```

-continued

```
                       itemID = ( (Integer) e.nextElement( ) ).intValue( );
                       mostRatingsItemIDList.add( (double) numRatingsHash.get(
itemID ), new Integer( itemID ) );
               }
               resultSize = Math.min( mostRatingsItemIDList.size( ), maxItems );
               for ( int i = 0; i < resultSize; i ++ )
               {
                       resultHash.put( mostRatingsItemIDList.elementAt( i ), new
Vector( ) );
               }
           }
           catch ( Exception e )
           {
               e.printStackTrace( );
           }
           return resultHash;
      }
      /**
       * Removes similar items from the given list that have the same
       * artist as the given item.
       *
       * @param   itemID        the ID of the item whose artist should not
       *                        be the same as any artists for the
items
       *                        in the given list of similar items
       * @param   simList       the list of items similar to the given item
       * @param   sql           the sql needed for retrieving the artist ID
       * @param   cache         the cache with item ID's mapped to artist ID's
       * @param   maxCacheSize  the maximum size of the given cache
       */
      private final static void removeItemsWithSameArtist( int itemID, Ordered List
simList, String sql, Hashtable cache, int maxCacheSize )
      {
          ResultSet rs;
          Integer itemIDInt;
          Integer artistID;
          Integer otherItemID;
          Integer otherArtistID;
          rs = null;
          itemIDInt = new Integer( itemID );
          artistID = (Integer) cache.get( itemIDInt );
          otherItemID = null;
          otherArtistID = null;
          try
          {
              if ( artistID == null )
              {
                  rs = DBConnection.executeSQL( CACHE__CONN__ID, sql +
itemID, false );
                  if ( rs.next( ) )
                  {
                      artistID = new Integer( rs.getInt( "artistID" ) );
                      if ( cache.size( ) < maxCacheSize )
                      {
                          cache.put( itemIDInt, artistID );
                      }
                  }
                  else
                  {
                      artistID = new Integer( -1 );
                  }
              }
              for ( int i = simList.size( ) - 1; i >= 0; i -- )
              {
                  otherItemID = new Integer( ( (GroupRating)
simList.elementAt( i ) ).getItemID( ) );
                  otherArtistID = (Integer) cache.get( otherItemID );
                  if ( otherArtistID == null )
                  {
                      rs = DBConnection.executeSQL( CACHE__CONN__ID,
sql + otherItemID, false );
                      if ( rs.next( ) )
                      {
                          otherArtistID = new Integer( rs.getInt( "artistID"
) );
                          if ( cache.size( ) < maxCacheSize )
                          {
                              cache.put( otherItemID, otherArtistID );
                          }
```

```
                }
                else
                {
                    otherArtistID = new Integer( artistID.intValue( ) -
1 );
                }
            }
            if ( artistID.intValue( ) == otherArtistID.intValue( ) )
            {
                simList.removeElementAt( i );
            }
        }
    }
    catch ( Exception e )
    {
        e.printStackTrace( );
    }
}
/**
 * Reads through lines of a ratings file starting on the line
 * after the given line and returns the first line that has a
 * different user ID than the user ID in the given line.
 *
 * @param   line    the starting line
 * @param   reader  the object reading the ratings file
 *
 * @return          the first line with a different user, or null
 *                  if the end of the file is reached
 */
private final static String readUpToNextUser( String line, LineNumberReader reader )
{
    StringTokenizer st;
    int firstUserID;
    int userID;
    st = null;
    firstUserID = 0;
    userID = 0;
    try
    {
        st = new StringTokenizer( line, "," );
        st.nextToken( );
        userID = Integer.parseInt( st.nextToken( ) );
        firstUserID = userID;
        while ( userID == firstUserID )
        {
            line = reader.readLine( );
            if( line != null )
            {
                st = new StringTokenizer( line, "," );
                st.nextToken( );
                userID = Integer.parseInt( st.nextToken( ) );
            }
            else
            {
                userID = firstUserID – 1;
            }
        }
    }
    catch ( Exception e )
    {
        e.printStackTrace( );
    }
    return line;
}
/**
 * Gets a String representation of this object.
 *
 * @return      the String description
 */
public String toString( )
{
    return "Item Type: " + itemType;
}
}
package com.launch.rm.lc.SimilaritiesEngine;
import com.launch.rm.lc.PlaylistGenerator.*;
import java.util.Vector;
/**
 * This class writes similarity data to the database. It takes the
```

-continued

```java
 * item type from the command line.
 *
 * @author John Veilleux
 */
public class SimilaritiesGenerator
{
    /**
     * The main method.
     *
     * @param  args   command line arguments
     */
    public static void main( String args[ ] )
    {
        Integer itemID;
        Byte itemType;
        SimilaritiesEngine engine;
        Vector itemIDVec;
        Vector similarIDVec;
        String sql;
        itemID = null;
        itemType = null;
        engine = null;
        itemIDVec = new Vector( );
        similarIDVec = null;
        sql = null;
        try
        {
            if ( args.length == 1 )
            {
                itemType = new Byte( args[ 0 ] );
            }
            else
            {
                throw new InstantiationException( );
            }
            if ( itemType.byteValue( ) < Constants.ITEM_TYPE_SONG ||
 itemType.byteValue( ) > Constants.ITEM_TYPE_ARTIST )
            {
                throw new Exception( "Item type must be " +
Constants.ITEM_TYPE_SONG + ", " + Constants.ITEM_TYPE_ALBUM + ", or " +
Constants.ITEM_TYPE_ARTIST + "." );
            }
            Debugger.out( "Similarities Generator started." );
            Debugger.resetTimer( "SimilaritiesGenerator" );
            engine = new SimilaritiesEngine( itemType.byteValue( ),
SimilaritiesConstants.MAX_ITEMS_TO_STORE[ itemType.intValue( ) ] );
            itemIDVec = engine.getItemIDs( );
            for ( int i = 0; i < itemIDVec.size( ); i ++ )
            {
                itemID = (Integer)itemIDVec.elementAt( i );
                similarIDVec = engine.getSimilar( itemID.intValue( ),
SimilaritiesConstants.MAX_SIMILAR_ITEMS_PER_ITEM ).asVector( );
                sql = "usp_a10xSimilar_SetSimilarItems_ixxd " + itemID + ",
" + itemType + ", " + similarIDVec.size( ) + ", '" + Util.GetVectorAsSpaceDelimitedList(
similarIDVec ) + "'";
                DBConnection.executeUpdate( sql, false );
                Debugger.out( "Generated " + similarIDVec.size( ) + "
similarities for item " + itemID );
            }
            Debugger.outTimerMIN( "SimilaritiesGenerator", "Similarities
Generator done." );
        }
        catch ( InstantiationException ie )
        {
            System.out.println( );
            System.out.println( "usage:" );
            System.out.println( " java SimilaritiesGenerator [item type]" );
        }
        catch ( Exception e )
        {
            e.printStackTrace( );
        }
    }
}
```

What is claimed is:

1. A method comprising:
providing a first community having members, each member of the first community having associated preferences regarding data stream content, the members of said first community are determined to have at least one preference in common;
determining characteristics of said first community members' preferences to provide determined characteristics; and
defining a different individual data stream for each user of a plurality of users, said defining comprising, for each individual data stream, selecting content for inclusion in said individual data stream according to said determined characteristics of said first member community's preferences, said individual data stream being biased according to said first community members' preferences.

2. The method as set forth in claim 1, wherein said step of selecting content for inclusion in an individual data stream further comprises:
selecting content for inclusion in an individual data stream according to said determined characteristics, said individual data stream being biased for positive preferences of said community and biased against negative preferences of said community.

3. The method as set forth in claim 1, wherein said step of providing a first community further comprises:
providing a second community having at least as many members as said first community, each member of said second community having associated preferences regarding data stream content;
evaluating said preferences of said second community; and
determining said first community from said second community, members of said first community comprising members of said second community determined to have at least one preference in common.

4. The method as set forth in claim 1, wherein the step of selecting content for inclusion in an individual data stream further comprises:
selecting content for inclusion in said individual data stream in accordance with sound recording performance restrictions.

5. The method as set forth in claim 1, wherein the method further comprises:
transmitting said individual data stream on a voluntary or selectable basis to allow an individual to receive said individual data stream on a voluntary or selectable basis.

6. A method comprising:
providing a second community having at least as many members as a first community, each member of said second community having associated preferences regarding data stream content;
evaluating said preferences of said second community; and
determining said first community from said second community, members of said first community comprising members of said second community determined to have at least one preference in common;
determining characteristics of preferences of said first community to provide determined characteristics;
defining a different individual data stream for each user of a plurality of users, said defining comprising, for each individual data stream, selecting content for inclusion in said individual data stream according to said determined characteristics, said individual data stream being biased according to said determined characteristics of said first member community's preferences, and said individual data stream being biased for positive preferences of said first community members and biased against negative preferences of said first community members; and
transmitting said individual data stream on a voluntary or selectable basis to allow an individual to receive said individual data stream on a voluntary or selectable basis.

7. A method comprising:
providing a first community having members, said first community being dynamically self-defining by means of preferences associated with each member of said first community regarding data stream content, said first community comprising members determined to have at least one preference in common;
determining characteristics of said first community members' preferences to provide determined characteristics;
defining a different individual data stream for each user of a plurality of users, said defining comprising, for each individual data stream, selecting content for inclusion in said individual data stream according to said determined characteristics of said first member community's preferences, said individual data stream being biased according to said first community members' preferences; and
repeating said providing, determining, and defining steps to re-establish said first community, to re-establish said preferences and determined characteristics, and to select content for inclusion in said individual data stream.

8. The method as set forth in claim 7, wherein said step of selecting content for inclusion in an individual data stream further comprises:
selecting content for inclusion in an individual data stream according to said determined characteristics, said individual data stream being biased for positive preferences of said community and biased against negative preferences of said community.

9. The method as set forth in claim 7, wherein said step of providing a first community further comprises:
providing a second community having at least as many members as said first community, each member of said second community having associated preferences regarding data stream content;
evaluating said preferences of said second community; and
determining said first community from said second community, members of said first community comprising members of said second community determined to have at least one preference in common.

10. The method as set forth in claim 7, wherein the step of selecting content for inclusion in an individual data stream further comprises:
selecting content for inclusion in accordance with sound recording performance restrictions.

11. The method as set forth in claim 7, wherein the method further comprises:
transmitting said individual data stream on a voluntary or selectable basis to allow an individual to receive said individual data stream on a voluntary or selectable basis.

12. The method as set forth in claim 7, wherein the step of providing a first community further comprises:
providing a first community, each member of which is determined to provide an artist rating which exceeds a predetermined rating threshold.

13. The method as set forth in claim 12, wherein the rating corresponds to a scale of 1 to 100 and the predetermined rating threshold is 70.

14. A method comprising:
providing a first community having members, said first community being dynamically self-defining by means of preferences associated with each member of said first community regarding data stream content;
providing a second community having at least as many members as said first community, each member of said second community having associated preferences regarding data stream content;
evaluating said second preferences of said second community; and
determining said first community from said second community, members of said first community comprising members of said second community determined to have at least one preference in common;
determining characteristics of said first community members' preferences to provide determined characteristics;
defining a different individual data stream for each user of a plurality of users, said defining comprising, for each individual data stream, selecting content for inclusion in said individual data stream according to said determined characteristics of said first member community's preferences, said individual data stream being biased for positive preferences of said first community members and biased against negative preferences of said first community members;
transmitting said individual data stream on a voluntary or selectable basis thereby allowing an individual to receive said individual data stream on a voluntary or selectable basis; and
repeating said steps of providing said first community, determining characteristics to provide said determined characteristics, defining said individual data stream including said selecting content for inclusion in said individual data stream, and transmitting said individual data stream in order to re-establish said first community, to re-establish said preferences and determined characteristics, and to select content for inclusion in said individual data stream.

15. A method comprising:
providing a first community having members, said first community being dynamically self-defining by means of preferences associated with each member of said first community regarding data stream content, said first community comprising members determined to have at least one preference in common;
determining characteristics of said first community members' preferences to provide determined characteristics;
defining a different individual data stream for each user of a plurality of users, said defining comprising, for each individual data stream, selecting content for inclusion in said individual data stream according to said determined characteristics of said first member community's preferences, said individual data stream being biased according to said first community members' preferences;
receiving preferences from a first user; and
transmitting said individual data stream to said first user, including content highly rated by said first user according to said preferences of said first user.

16. The method as set forth in claim 15, wherein said step of selecting content for inclusion in an individual data stream further comprises:
selecting content for inclusion in an individual data stream according to said determined characteristics, said individual data stream being biased for positive preferences of said community and biased against negative preferences of said community.

17. The method as set forth in claim 15, wherein the step of providing a first community further comprises:
providing a second community having at least as many members as said first community, each member of said second community having associated preferences regarding data stream content;
evaluating said preferences of said second community; and
determining said first community from said second community, members of said first community comprising members of said second community determined to have at least one preference in common.

18. The method as set forth in claim 15, wherein the step of selecting content for inclusion in an individual data stream further comprises:
selecting content for inclusion in said individual data stream in accordance with sound recording performance restrictions.

19. The method as set forth in claim 15, wherein the step of transmitting said individual data stream further comprises:
transmitting said individual data stream on a voluntary or selectable basis to allow an individual to receive said individual data stream on a voluntary or selectable basis.

20. The method as set forth in claim 15, wherein the step of providing a first community further comprises:
providing a first community, each member of which is determined to provide an artist rating which exceeds a predetermined rating threshold.

21. The method as set forth in claim 20, wherein the rating corresponds to a scale of 1 to 100 and the predetermined rating threshold is 70.

22. A method comprising:
providing a first community having members, said first community being dynamically self-defining by means of preferences associated with each member of said first community regarding data stream content;
providing a second community having at least as many members as said first community, each member of said second community having associated preferences regarding data stream content;
evaluating said second preferences of said second community; and
determining said first community from said second community, members of said first community comprising members of said second community determined to have at least one preference in common;
determining characteristics of said first community members' preferences to provide determined characteristics;
receiving preferences from a first user;
defining a different individual data stream for each user of a plurality of users, said defining comprising, for each individual data stream, selecting content for inclusion in said individual data stream according to said determined characteristics of said first member community's preferences and according to said preferences of said first user, said individual data stream being biased for positive preferences of said first community members and biased against negative preferences of said first community members, and said individual data stream being biased according to said preferences of said first user;
transmitting said individual data stream to said first user, including content highly rated by said first user according to said preferences of said first user, said individual data stream transmitted on a voluntary or selectable basis to allow said first user to receive said individual data stream on a voluntary or selectable basis; and
repeating said steps of providing said first community, determining characteristics to provide said determined characteristics, defining said individual data stream including said selecting content for inclusion in said individual data stream, and transmitting said individual data stream in order to re-establish said first community, to re-establish said preferences and determined characteristics, and to select content for inclusion in said individual data stream.

23. A method comprising:
repeatedly receiving preferences from receivers of data stream content of a music-related database including songs and/or music videos;
repeatedly determining a first community of receivers from said received preferences to allow said first community to evolve over time, said first community having similar preferences for similar data stream content;
repeatedly determining characteristics solely of said received preferences of said first community to provide determined characteristics; and
defining a different individual data stream for each user of a plurality of users, said defining comprising, for each individual data stream, selecting content for inclusion in said individual data stream of said music-related database according to said determined characteristics of said first member community's preferences, said individual data stream being biased according to said received preferences of said first community,
said individual data stream having more content that said first community likes and less content that said first community dislikes without analysis of said data stream content, and both said first community and said determined characteristics are permitted to change over time according to said received preferences of said first community.

24. The method as set forth in claim 23, wherein said step of selecting content for inclusion in an individual data stream further comprises:
selecting content for inclusion in an individual data stream according to said determined characteristics, said individual data stream being biased for positive preferences of said first community and biased against negative preferences of said first community.

25. The method as set forth in claim 23, wherein the step of repeatedly receiving preferences from receivers of data stream content further comprises:
repeatedly receiving preferences of a second community, said second community having at least as many members as said first community, said received preferences regarding data stream content of said music-related database;
repeatedly evaluating said preferences of said second community; and
repeatedly determining said first community from said second community, members of said first community comprising members of said second community determined to have at least one preference in common.

26. The method as set forth in claim 23, wherein the step of selecting content for inclusion in an individual data stream further comprises:
selecting content for inclusion in said individual data stream in accordance with sound recording performance restrictions.

27. The method as set forth in claim 23, wherein the method further comprises:
transmitting said individual data stream on a voluntary or selectable basis to allow an individual to receive said individual data stream on a voluntary or selectable basis.

28. A method comprising:
repeatedly receiving preferences of a first community having a plurality of members, said first preferences regarding data stream content of a first music-related database including songs and/or music videos;
repeatedly receiving preferences of a second community, said second community having at least as many members as said first community, said received preferences regarding data stream content of said music-related database;
evaluating said received preferences of said second community to provide evaluated preferences;
repeatedly determining said first community from said second community by means of said evaluated preferences with members of said first community having at least one preference in common;
repeatedly determining characteristics solely of said first community members' preferences with regard to said data stream content to provide determined characteristics;
defining a different individual data stream for each user of a plurality of users, said defining comprising, for each individual data stream, selecting content for inclusion in said individual data stream of said music-related database according to said determined characteristics, said individual data stream being biased according to said determined characteristics of said first member community's preferences, and said individual data stream being biased for positive preferences of said first community and biased against negative preferences of said first community; and
transmitting said individual data stream on a voluntary or selectable basis to allow an individual to receive said individual data stream on a voluntary or selectable basis,
said individual data stream having more content that said first community likes and less content that said first community dislikes without resort to analysis of said data stream content, and both said first community and said determined characteristics are permitted to change over time according to, respectively, said preferences of said second community and said preferences of said first community.

29. A computer-implemented method comprising:
repeatedly receiving preferences from receivers of data stream content of a music-related database including songs and/or music videos;
repeatedly determining a first community of receivers from said received preferences, said first community having similar preferences for similar data stream content;
repeatedly determining characteristics solely of said received preferences of said first community to provide determined characteristics; and
defining a different individual data stream for each user of a plurality of users, said defining comprising, for each individual data stream, selecting content for inclusion in said individual data stream of said music-related database according to said determined characteristics of said first member community's preferences, said individual data stream being biased according to said received preferences of said first community,
said individual data stream having more content that said evolving first community likes and less content that said first community dislikes without analysis of said data stream content, and both said first community and said determined characteristics are permitted to change over time according to said received preferences of said first community.

30. The computer-implemented method as set forth in claim 29, wherein said step of selecting content for inclusion in an individual data stream further comprises:

selecting content for inclusion in an individual data stream according to said determined characteristics, said individual data stream being biased for positive preferences of said first community and biased against negative preferences of said first community.

31. The computer-implemented method as set forth in claim 29, wherein the step of repeatedly receiving preferences from receivers of data stream content further comprises:

repeatedly receiving preferences of a second community, said second community having at least as many members as said first community, said received preferences regarding data stream content of said music-related database;

repeatedly evaluating said preferences of said second community; and repeatedly determining said first community from said second community, members of said first community comprising members of said second community determined to have at least one preference in common.

32. The computer-implemented method as set forth in claim 29, wherein the step of selecting content for inclusion in an individual data stream further comprises:

selecting content for inclusion in said individual data stream in accordance with sound recording performance restrictions.

33. The computer-implemented method as set forth in claim 29, wherein the method further comprises:

transmitting said individual data stream on a voluntary or selectable basis to allow an individual to receive said individual data stream on a voluntary or selectable basis.

34. A computer-implemented method comprising:

repeatedly receiving preferences of a first community having a plurality of members, said preferences regarding data stream content of a music-related database including songs and/or music videos;

repeatedly receiving preferences of a second community, said second community having at least as many members as said first community, said received preferences regarding data stream content of said music-related database;

evaluating said preferences of said second community to provide evaluated second preferences;

repeatedly determining said first community from said second community by means of said evaluated second preferences, members of said first community comprising members of said second community determined to have at least one preference in common;

repeatedly determining characteristics solely of said first community members' preferences with regard to said data stream content to provide determined characteristics;

defining a different individual data stream for each user of a plurality of users, said defining comprising, for each individual data stream, selecting content for inclusion in said individual data stream of said music-related database according to said determined characteristics of said first member community's preferences, said individual data stream being biased according to said determined characteristics, and said individual data stream being biased for positive preferences of said first community and biased against negative preferences of said first community; and transmitting said individual data stream on a voluntary or selectable basis to allow an individual to receive said individual data stream on a voluntary or selectable basis, said individual data stream having more content that said first community likes and less content that said first community dislikes without resort to analysis of said data stream content, and both said first community and said determined characteristics are permitted to change over time according to, respectively, said preferences of said second community and said preferences of said first community.

35. A computer system comprising:

a server located in a first location, said server repeatedly receiving preferences from users, said users being receivers of data stream content of a music-related database including songs and/or music videos;

said server repeatedly determining a first community from said received preferences, said first community having similar preferences for similar content in said first data streams;

said server repeatedly determining characteristics solely of said preferences of said first community with regard to said data stream content to provide determined characteristics; and said server defining a different individual data stream for each user of a plurality of users, said defining comprising, for each individual data stream, selecting content for inclusion in said individual data stream of said music-related database according to said determined characteristics of said first member community's preferences, said individual data stream being biased according to said received preferences of said first community;

said individual data stream having more content that said evolving first community likes and less content that said first community dislikes without analysis of said data stream content, and both said first community and said determined characteristics are permitted to change over time according to said preferences of said first community.

36. The computer system as set forth in claim 35, wherein said server selecting content for inclusion in an individual data stream further comprises:

said server selecting content for inclusion in an individual data stream according to said determined characteristics, said individual data stream being biased for positive preferences of said first community and biased against negative preferences of said first community.

37. The computer system as set forth in claim 35, wherein said server repeatedly receiving preferences from receivers of content in first data streams further comprises:

said server repeatedly receiving preferences of a second community, said second community having at least as many members as said first community, said received preferences regarding data stream content of said music-related database;

said server repeatedly evaluating said preferences of said second community; and said server repeatedly determining said first community from said second community members of said first community are members of said second community determined to have at least one preference in common.

38. The computer system as set forth in claim 35, wherein said server selecting content for inclusion in an individual data stream further comprises:

said server selecting content for inclusion in said individual data stream in accordance with sound recording performance restrictions.

39. The computer system as set forth in claim 35, said system further comprises:

said server transmitting said individual data stream on a voluntary or selectable basis to allow an individual to receive said individual data stream on a voluntary or selectable basis.

40. The computer system as set forth in claim 35, further comprising:
said server being in said first location and at least one of said users being in a second location, said second location being a different country than said first location.

41. A computer system comprising:
a server repeatedly receiving preferences of a first community having a plurality of members, said received preferences regarding data stream content of a first music-related database including songs and/or music videos;
said server repeatedly receiving preferences of a second community having a plurality of members, said second preferences regarding data stream content of said music-related database;
said server evaluating said second preferences of said second community to provide evaluated second preferences;
said server repeatedly determining said first community from said second community by means of said evaluated second preferences with members of said first community having at least one preference in common;
said server repeatedly determining characteristics solely of said first community members' preferences with regard to said data stream content to provide determined characteristics;
said server defining a different individual data stream for each user of a plurality of users, said defining comprising, for each individual data stream, selecting content for inclusion in said individual data stream of said music-related database according to said determined characteristics of said first member community's preferences, said individual data stream being biased for positive preferences of said first community and biased against negative preferences of said first community; and
said server transmitting said individual data stream on a voluntary or selectable basis to allow an individual to receive said individual data stream on a voluntary or selectable basis,
said individual data stream having more content that said first community likes and less content that said first community dislikes without resort to analysis of said data stream content, and both said first community and said determined characteristics are permitted to change over time according to, respectively, said preferences of said second community and said preferences of said first community.

42. The computer system as set forth in claim 41, further comprising:
said server being in said first location and at least one member of said first or second communities being in a second location, said second location being a different country than said first location.

43. A computer-implemented method comprising:
determining a first community of members by filtering a data store of preferences for data stream content, said data stream content comprising data stream elements, said members of said first community having at least one stored preference in common;
determining data stream elements of said data stream content by filtering said data stream content using said stored preferences of said members of said first community, each determined data stream element being preferred by said first member community;
defining a different individual data stream for each user of a plurality of users, said defining comprising, for each individual data stream, further filtering said determined data stream elements using said stored preferences of said members of said first community to select at least one data stream element from said determined data stream elements for inclusion in said individual data stream; and
transmitting said individual data stream to a user computer.

44. The computer-implemented method as set forth in claim 43, said stored preferences including rating information received from a second community:
said determining a first community further comprising filtering said stored preferences using a first rating threshold, each member of said first community having a preference for at least one data stream element in said data stream content such that said rating information of said member for said at least one data stream element satisfies a first rating threshold;
said determining data stream elements of said data stream content further comprising filtering said data stream content using rating information of said first community and a second rating threshold, each determined data stream element having rating information of at least one member of said first community that exceeds said second rating threshold;
said defining an individual data stream further comprising further filtering said determined data stream elements, each data stream element selected from the determined data stream elements is determined to be preferred by at least a threshold percentage of said members of said first community.

* * * * *